United States Patent
Papasakellariou

(10) Patent No.: US 11,172,497 B2
(45) Date of Patent: Nov. 9, 2021

(54) TRANSMISSION OF UL CONTROL CHANNELS WITH DYNAMIC STRUCTURES

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/946,720

(22) Filed: Jul. 1, 2020

(65) Prior Publication Data

US 2020/0337074 A1 Oct. 22, 2020

Related U.S. Application Data

(63) Continuation of application No. 15/791,014, filed on Oct. 13, 2017, now Pat. No. 10,708,938.

(Continued)

(51) Int. Cl.
*H04W 72/00* (2009.01)
*H04W 72/12* (2009.01)
(Continued)

(52) U.S. Cl.
CPC ....... *H04W 72/1268* (2013.01); *H04L 1/1671* (2013.01); *H04L 1/1861* (2013.01);
(Continued)

(58) Field of Classification Search
CPC .............. H04L 5/0057; H04W 72/042; H04W 72/0446; H04W 72/1289; H04W 72/044;
(Continued)

(56) References Cited

U.S. PATENT DOCUMENTS 8,902,841 B2 * 12/2014 Suzuki ................ H04L 25/0224
370/329
9,271,285 B2 * 2/2016 Suzuki .............. H04W 72/1289
(Continued)

FOREIGN PATENT DOCUMENTS

CN 102148672 A 8/2011
CN 102316595 A 1/2012
(Continued)

OTHER PUBLICATIONS

Adaptive Resource Allocation Based Packet Scheduling For LTE uplink by Xuejun Sha; Jin Sun; Tonghui Wu; Liang Liu Published in: 2012 IEEE 11th International Conference on Signal Processing Apr. 2013 (Year: 2013).*

(Continued)

*Primary Examiner* — William D Cumming

(57) ABSTRACT

A method of a user equipment (UE) for transmitting acknowledgement information. The method comprises receiving a physical downlink control channel conveying a downlink control information (DCI) format, a physical downlink shared channel conveying one or more data transport blocks scheduled by the DCI format, and configuration information for transmission of a physical uplink control channel (PUCCH) conveying acknowledgement information in response to the reception of the one or more data transport blocks; and transmitting the PUCCH in time-frequency resources within a first slot. An index of the first slot is configured by the DCI format. The time-frequency resources within the first slot are configured by the DCI format through a configuration of an index of a first symbol, a number of consecutive slot symbols, and an index of a first frequency resource block.

20 Claims, 16 Drawing Sheets

Related U.S. Application Data

(60) Provisional application No. 62/542,458, filed on Aug. 8, 2017, provisional application No. 62/451,889, filed on Jan. 30, 2017, provisional application No. 62/415,235, filed on Oct. 31, 2016.

(51) Int. Cl.

| | | |
|---|---|---|
| *H04L 5/00* | (2006.01) | |
| *H04L 1/18* | (2006.01) | |
| *H04L 1/16* | (2006.01) | |
| *H04W 72/04* | (2009.01) | |
| *H04W 28/06* | (2009.01) | |

(52) U.S. Cl.
CPC .......... *H04L 5/0053* (2013.01); *H04L 5/0094* (2013.01); *H04W 72/042* (2013.01); *H04W 72/0446* (2013.01); *H04L 1/1812* (2013.01); *H04L 1/1858* (2013.01); *H04L 5/0007* (2013.01); *H04L 5/0035* (2013.01); *H04L 5/0051* (2013.01); *H04L 5/0055* (2013.01); *H04W 28/06* (2013.01)

(58) Field of Classification Search
CPC ......... H04W 74/0833; H04W 72/0453; H04W 72/1242; H04W 52/325; H04W 72/1288
USPC .................. 370/329, 335, 252, 208
See application file for complete search history.

(56) References Cited

U.S. PATENT DOCUMENTS

| | | | |
|---|---|---|---|
| 9,351,289 B2 | 5/2016 | Kim et al. | |
| 9,485,763 B2 | 11/2016 | You et al. | |
| 9,516,643 B2* | 12/2016 | Suzuki | H04L 5/0048 |
| 9,591,631 B2 | 3/2017 | You et al. | |
| 9,609,647 B2 | 3/2017 | You et al. | |
| 9,686,047 B2* | 6/2017 | Suzuki | H04L 5/001 |
| 9,769,838 B2 | 9/2017 | You et al. | |
| 9,867,179 B2* | 1/2018 | Suzuki | H04L 5/0048 |
| 9,876,615 B2 | 1/2018 | You et al. | |
| 9,876,622 B2 | 1/2018 | Montojo et al. | |
| 9,876,623 B2* | 1/2018 | Papasakellariou | H04L 5/001 |
| 10,033,506 B2* | 7/2018 | Golitschek Edler von Elbwart | H04W 72/0406 |
| 10,334,589 B2* | 6/2019 | Stephenne | H04W 72/1242 |
| 10,375,734 B2* | 8/2019 | Suzuki | H04J 13/22 |
| 10,541,788 B2 | 1/2020 | You et al. | |
| 10,666,413 B2* | 5/2020 | Papasakellariou | H04L 5/0057 |
| 10,708,938 B2* | 7/2020 | Papasakellariou | H04L 5/0094 |
| 10,721,030 B2 | 7/2020 | Seo et al. | |
| 10,904,059 B2* | 1/2021 | Nguyen | H04W 4/40 |
| 2010/0118719 A1 | 5/2010 | Ishii | H04W 72/0453 370/252 |
| 2011/0013506 A1* | 1/2011 | Ishii | H04W 72/1242 370/208 |
| 2011/0044196 A1* | 2/2011 | Ishii | H04L 1/1692 370/252 |
| 2011/0044275 A1* | 2/2011 | Ishii | H04W 52/325 370/329 |
| 2013/0051341 A1* | 2/2013 | Suzuki | H04L 5/0005 370/329 |
| 2013/0148593 A1* | 6/2013 | Suzuki | H04L 5/0048 370/329 |
| 2014/0098780 A1 | 4/2014 | Kim et al. | |
| 2014/0247799 A1* | 9/2014 | Suzuki | H04W 74/0833 370/329 |
| 2014/0286255 A1 | 9/2014 | Nam et al. | |
| 2015/0063272 A1* | 3/2015 | Suzuki | H04L 5/0051 370/329 |
| 2015/0071206 A1* | 3/2015 | Seo | H04W 74/0833 370/329 |
| 2015/0092728 A1 | 4/2015 | Wang et al. | |
| 2015/0230211 A1 | 8/2015 | You et al. | |
| 2015/0245323 A1 | 8/2015 | You et al. | |
| 2015/0249972 A1 | 9/2015 | You et al. | |
| 2015/0280876 A1 | 10/2015 | You et al. | |
| 2016/0021647 A1* | 1/2016 | Hui | H04W 72/044 370/335 |
| 2016/0135153 A1* | 5/2016 | Suzuki | H04L 5/0051 370/329 |
| 2016/0174247 A1 | 6/2016 | Ruiz Delgado et al. | |
| 2016/0183244 A1* | 6/2016 | Papasakellariou | H04L 5/0057 370/329 |
| 2016/0294531 A1 | 10/2016 | Loehr et al. | |
| 2017/0048834 A1* | 2/2017 | Suzuki | H04W 72/1289 |
| 2017/0142738 A1 | 5/2017 | You et al. | |
| 2018/0092074 A1* | 3/2018 | Suzuki | H04L 5/0048 |
| 2018/0123741 A1 | 5/2018 | You et al. | |
| 2018/0124815 A1* | 5/2018 | Papasakellariou | H04W 72/1268 |
| 2018/0145817 A1* | 5/2018 | Papasakellariou | H04L 5/001 |
| 2018/0167938 A1* | 6/2018 | Stephenne | H04W 72/0446 |
| 2018/0278398 A1* | 9/2018 | Ahn | H04L 5/00 |
| 2019/0313465 A1* | 10/2019 | Suzuki | H04J 13/22 |
| 2020/0145270 A1* | 5/2020 | Nguyen | H04L 5/0023 |
| 2020/0287694 A1* | 9/2020 | Papasakellariou | H04L 5/001 |
| 2020/0337073 A1* | 10/2020 | Papasakellariou | H04W 72/0446 |
| 2020/0337074 A1* | 10/2020 | Papasakellariou | H04L 5/0053 |
| 2020/0344031 A1* | 10/2020 | Shao | H04L 5/00 |
| 2021/0037501 A1* | 2/2021 | Sun | H04W 72/0453 |
| 2021/0091988 A1* | 3/2021 | Papasakellariou | H04L 27/2613 |

FOREIGN PATENT DOCUMENTS

| | | |
|---|---|---|
| CN | 104365163 A | 2/2015 |
| CN | 102986158 B | 6/2016 |
| EP | 3 598 827 A1 * | 5/2016 |
| KR | 10-2012-0067365 A | 6/2012 |
| WO | 2012124958 A2 | 9/2012 |
| WO | 2016144243 A1 | 9/2016 |
| WO | WO2019192422 A1 * | 10/2019 |

OTHER PUBLICATIONS

The Evolution of LTE Physical Layer Control Channels by Mao Wang; Jingjing Zhang; Bingying Ren; Wenjie Yang; Jun Zou; Min Hua; Xiaohu You Published in: IEEE Communications Surveys & Tutorials (vol. 18, Issue: 2, Secondquarter 2016) Dec. 2015 (Year: 2015).*
Office Action dated Nov. 4, 2020 in connection with co-pending U.S. Appl. No. 16/946,719, 32 pages.
Wang, et al., "The Evolution of LTE Physical Layer Control Channels," IEEE Communications Surveys & Turotials, vol. 18, No. 2, Dec. 18, 2015, 19 pages.
Notice of Allowance dated Feb. 10, 2012 in connection with co-pending U.S. Appl. No. 16/946,719, 14 pages.
Extended European Search Report regarding Application No. 21164283.0, dated Jun. 15, 2021, 7 pages.
LG Electronics, "New PUCCH format design for Rel-13 CA", 3GPP TSG RAN WG1 Meeting #83, R1-156849, Nov. 2015, 8 pages.
China National Intellectual Property Administration, First Office Action regarding Application No. 201780068932.1, dated Jun. 24, 2021, 21 pages.
China National Intellectual Property Administration, First Office Action regarding Application No. 201780068932.1, dated Jun. 24, 2021.
Intellectual Property India, Examination Report regarding Application No. 201937017101, dated Sep. 15, 2021, 5 pages.

* cited by examiner

US 11,172,497 B2

TRANSMISSION OF UL CONTROL CHANNELS WITH DYNAMIC STRUCTURES

CROSS-REFERENCE TO RELATED APPLICATIONS AND CLAIM OF PRIORITY

This application is a continuation of U.S. Non-Provisional patent application Ser. No. 15/791,014 filed Oct. 23, 2017, and claims priority to U.S. Provisional Patent Application No. 62/415,235 filed Oct. 31, 2016, U.S. Provisional Patent Application No. 62/451,889 filed Jan. 30, 2017, and U.S. Provisional Patent Application No. 62/542,458 filed Aug. 8, 2017. The content of the above-identified patent documents is incorporated herein by reference.

TECHNICAL FIELD

The present application relates generally to a wireless communication system. More specifically, this disclosure relates to supporting transmissions of uplink control channels with dynamic structure.

BACKGROUND

A user equipment (UE) is commonly referred to as a terminal or a mobile station, can be fixed or mobile, and can be a cellular phone, a personal computer device, or an automated device. A gNB is generally a fixed station and can also be referred to as a base station, an access point, or other equivalent terminology. A communication system includes a downlink (DL) that refers to transmissions from a base station or one or more transmission points to UEs and an uplink (UL) that refers to transmissions from UEs to a base station or to one or more reception points.

SUMMARY

The present disclosure relates to a pre-$5^{th}$-generation (5G) or 5G communication system to be provided for supporting higher data rates beyond $4^{th}$-generation (4G) communication system such as long term evolution (LTE). The present disclosure relates to defining physical uplink control channel (PUCCH) structures supporting variable numbers of available symbols for a PUCCH transmission; indicating a duration or a format for a PUCCH transmission by a downlink control information (DCI) format triggering the PUCCH transmission; increasing a multiplexing capacity of a PUCCH transmitted over one or multiple frequency resource blocks (RBs); determining a power for a PUCCH transmission over a variable number of symbols; and defining mechanisms for providing dynamic resource availability for transmission of scheduling requests (SRs) from user equipments (UEs).

In one embodiment, a user equipment (UE) comprises a receiver configured to receive a physical downlink control channel (PDCCH) conveying a downlink control information (DCI) format, receive a physical downlink shared channel (PDSCH) conveying one or more data transport blocks scheduled by the DCI format, and receive configuration information for transmission of a physical uplink control channel (PUCCH) conveying acknowledgement information in response to receiving the one or more data transport blocks. The UE further comprises a transmitter configured to transmit the PUCCH in time-frequency resources within a first slot. An index of the first slot is configured by the DCI format. The time-frequency resources within the first slot are configured by the DCI format through a configuration of an index of a first slot symbol, a number of consecutive slot symbols $N_{symbols}^{slot}$, and an index of a first frequency resource block (RB).

In another embodiment, a base station comprises a transmitter configured to transmit a physical downlink control channel (PDCCH) conveying a downlink control information (DCI) format, transmit a physical downlink shared channel (PDSCH) conveying one or more data transport blocks scheduled by the DCI format, and transmit configuration information for reception of a physical uplink control channel (PUCCH) conveying acknowledgement information in response to transmitting the one or more data transport blocks. The base station further comprises a receiver configured to receive the PUCCH in time-frequency resources within a first slot. An index of the first slot is configured by the DCI format. The time-frequency resources within the first slot are configured by the DCI format through a configuration of an index of a first symbol, a number of consecutive symbols $N_{symbols}^{slot}$, and an index of a first frequency resource block (RB).

In yet another embodiment, a method of a user equipment (UE) for transmitting acknowledgement information is provided. The method comprises receiving a physical downlink control channel (PDCCH) conveying a downlink control information (DCI) format, receiving a physical downlink shared channel (PDSCH) conveying one or more data transport blocks scheduled by the DCI format, receiving configuration information for transmission of a physical uplink control channel (PUCCH) conveying acknowledgement information in response to receiving the one or more data transport blocks, and transmitting the PUCCH in time-frequency resources within a first slot. An index of the first slot is configured by the DCI format. The time-frequency resources within the first slot are configured by the DCI format through a configuration of an index of a first symbol, a number of consecutive symbols $N_{symbols}^{slot}$, and an index of a first frequency resource block (RB).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Aspects, features, and advantages of the present disclosure are readily apparent from the following detailed description, simply by illustrating a number of particular embodiments and implementations, including the best mode contemplated for carrying out the present disclosure. The present disclosure is also capable of other and different embodiments, and its several details can be modified in various obvious respects, all without departing from the spirit and scope of the present disclosure. Accordingly, the drawings and description are to be regarded as illustrative in nature, and not as restrictive. The present disclosure is illustrated by way of example, and not by way of limitation, in the figures of the accompanying drawings.

In the following, both frequency division duplexing (FDD) and time division duplexing (TDD) are considered as the duplex method for DL and UL signaling.

Although exemplary descriptions and embodiments to follow assume orthogonal frequency division multiplexing (OFDM) or orthogonal frequency division multiple access (OFDMA), this present disclosure can be extended to other OFDM-based transmission waveforms or multiple access schemes such as filtered OFDM (F-OFDM) or OFDM with zero cyclic prefix.

This present disclosure covers several components which can be used in conjunction or in combination with one another, or can operate as standalone schemes

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 17, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: 3GPP TS 36.211 v13.2.0, "E-UTRA, Physical channels and modulation;" 3GPP TS 36.212 v13.2.0, "E-UTRA, Multiplexing and Channel coding;" 3GPP TS 36.213 v13.2.0, "E-UTRA, Physical Layer Procedures;" 3GPP TS 36.321 v13.2.0, "E-UTRA, Medium Access Control (MAC) protocol specification;" and 3GPP TS 36.331 v13.2.0, "E-UTRA, Radio Resource Control (RRC) Protocol Specification."

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
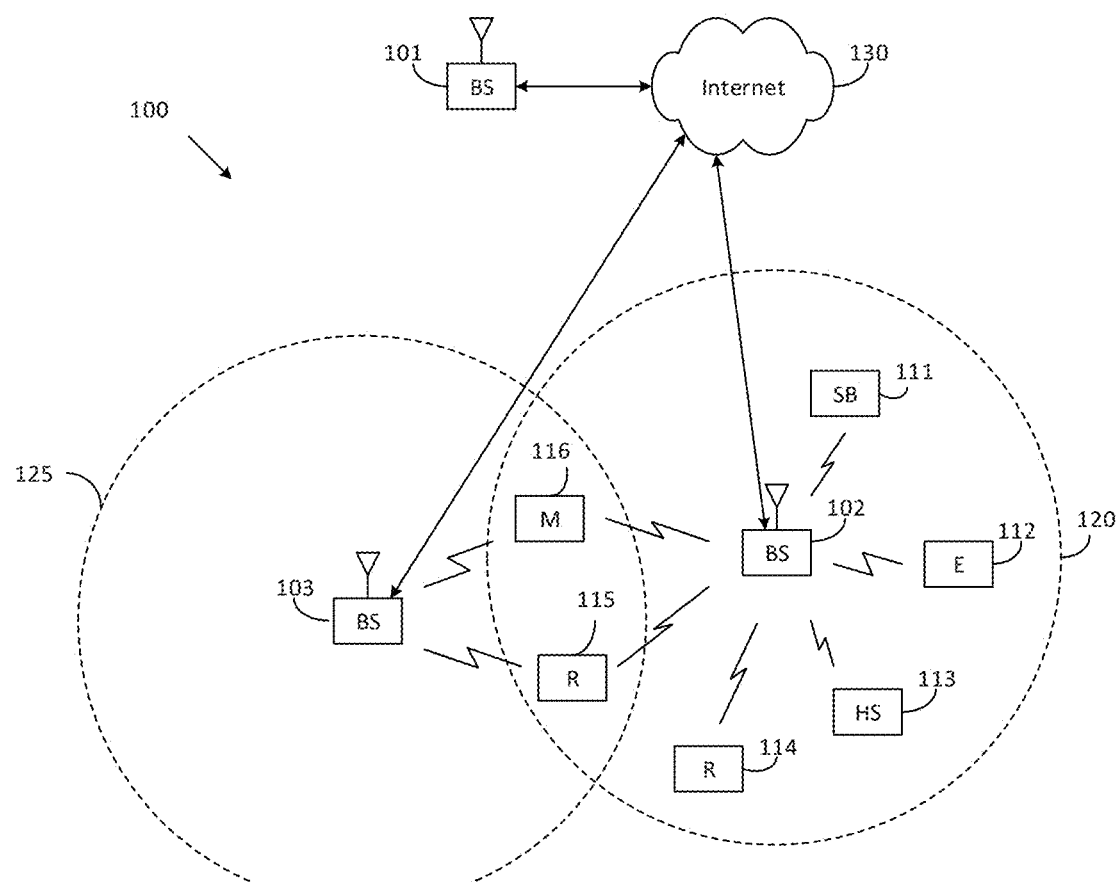
FIG. 1 illustrates an example wireless network according to embodiments of the present disclosure.
Figure 2:
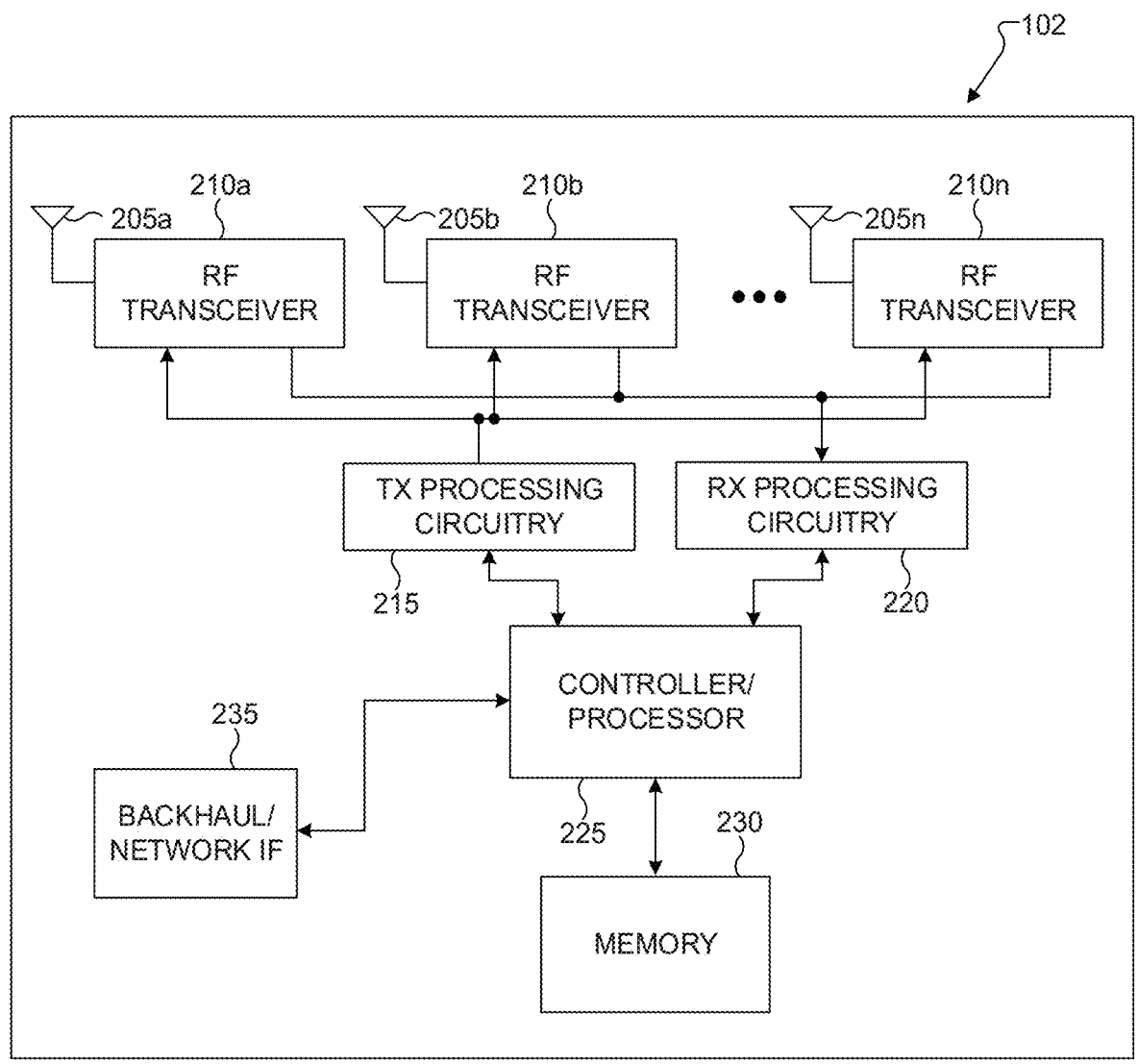
FIG. 2 illustrates an example gNB according to embodiments of the present disclosure.
Figure 3:
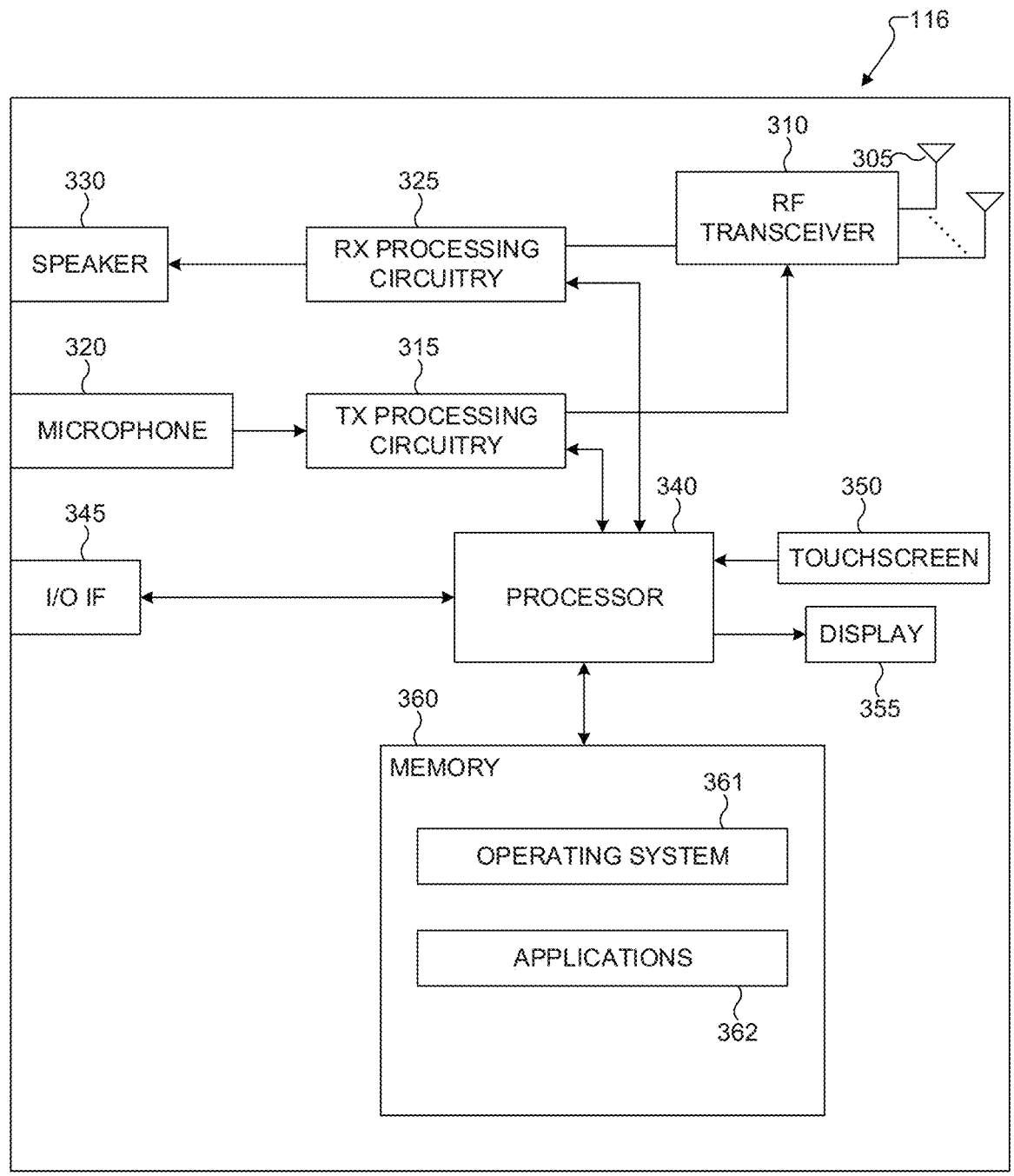
FIG. 3 illustrates an example UE according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101, a gNB 102, and a gNB 103. The gNB 101 communicates with the gNB 102 and the gNB 103. The gNB 101 also communicates with at least one network 130, such as the Internet, a proprietary internet protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or gNB), gNB, a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "eNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses a gNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for efficient CSI reporting on an uplink channel in an advanced wireless communication system. In certain embodiments, and one or more of the gNBs 101-103 includes circuitry, programming, or a combination thereof, for receiving efficient CSI reporting on an uplink channel in an advanced wireless communication system.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing. In some embodiments, the RF transceivers 210a-210n are capable of transmitting a physical downlink control channel (PDCCH) conveying a downlink control information (DCI) format, a physical downlink shared channel (PDSCH) conveying one or more data transport blocks scheduled by the DCI format, and configuration information for reception of a physical uplink control channel (PUCCH) conveying acknowledgement information in response to transmitting the one or more data transport blocks.

In some embodiments, the RF transceivers 210a-210n are capable of receiving the PUCCH in time-frequency resources within a first slot. An index of the first slot is configured by the DCI format. The time-frequency resources within the first slot are configured by the DCI format through a configuration of an index of a first slot symbol, a number of consecutive slot symbols $N_{symbols}^{slot}$, and an index of a first frequency resource block (RB).

In some embodiments, the RF transceivers 210a-210n are capable of receiving the PUCCH in time-frequency resources within a second slot. An index of a first slot symbol and a number of consecutive slot symbols for the PUCCH reception within the second slot are same as the respective ones within the first slot.

In some embodiments, the RF transceivers 210a-210n are capable of receiving the PUCCH by receiving reference signals and acknowledgement signals in an alternating manner per slot symbol over the number of consecutive slot symbols.

In some embodiments, the RF transceivers 210a-210n are capable of transmitting a configuration information of a cyclic shift for a sequence and of receiving the sequence with the cyclic shift in at least one slot symbol from the number of consecutive slot symbols $N_{symbols}^{slot}$.

In some embodiments, the RF transceivers 210a-210n are capable of transmitting a configuration information for a code rate and of receiving the PUCCH over a number of consecutive frequency RBs, starting from the first frequency RB, and wherein the number of consecutive frequency RBs is a smallest number resulting to an acknowledgement information code rate that is smaller than or equal to the code rate.

In some embodiments, the RF transceivers 210a-210n are capable of transmitting a broadcast channel indicating a maximum number of first slot symbols that are used for downlink transmissions.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

In some embodiments, the controller/processor 225 includes at least one microprocessor or microcontroller. As described in more detail below, the gNB 102 may include circuitry, programming, or a combination thereof for processing of an uplink channel and/or a downlink channel. For example, controller/processor 225 can be configured to execute one or more instructions, stored in memory 230, that are configured to cause the controller/processor to process the signal.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving a physical downlink control channel (PDCCH) conveying a downlink control information (DCI) format, a physical downlink shared channel (PDSCH) conveying one or more data transport blocks scheduled by the DCI format, and configuration information for transmitting a physical uplink control channel (PUCCH) conveying acknowledgement information in response to receiving the one or more data transport blocks.

In some embodiments, the RF transceiver 310 is capable of transmitting the PUCCH in time-frequency resources within a first slot. An index of the first slot is configured by the DCI format. The time-frequency resources within the first slot are configured by the DCI format through a configuration of an index of a first slot symbol, a number of consecutive slot symbols $N_{symbols}^{slot}$, and an index of a first frequency resource block (RB).

In some embodiments, the RF transceiver 310 is capable of transmitting the PUCCH in time-frequency resources within a second slot. An index of a first slot symbol and a number of consecutive slot symbols for the PUCCH reception within the second slot are same as the respective ones within the first slot.

In some embodiments, the RF transceiver 310 is capable of transmitting the PUCCH by transmitting reference signals and acknowledgement signals in an alternating manner per slot symbol over the number of consecutive slot symbols.

In some embodiments, the RF transceiver 310 is capable of transmitting the PUCCH over two different bandwidth parts.

In such embodiments, the number of consecutive slot symbols for the PUCCH transmission in a first bandwidth part is $\lceil N_{symbols}^{slot}/2 \rceil$ where $\lceil\ \rceil$ is a ceiling function that rounds a number to next larger integer; and the DCI format jointly indicates the index of the first frequency RB in the first bandwidth part and an index of a first frequency RB in a second bandwidth part.

In such embodiments, the PUCCH transmission is punctured in the first slot symbol of the second bandwidth part when a subcarrier spacing for the PUCCH transmission is larger than or equal to a predetermined value.

In some embodiments, the RF transceiver 310 is capable of receiving a configuration information of a cyclic shift for a sequence and transmitting the sequence with the cyclic shift in at least one slot symbol from the number of consecutive slot symbols $N_{symbols}^{slot}$.

In some embodiments, the RF transceiver 310 is capable of receiving a configuration information for a code rate and transmitting the PUCCH over a number of consecutive frequency RBs, starting from the first frequency RB, and wherein the number of consecutive frequency RBs is a smallest number resulting to an acknowledgement information code rate that is smaller than or equal to the code rate.

In some embodiments, the RF transceiver 310 is capable of receiving a broadcast channel indicating a maximum number of first slot symbols that are used for downlink transmissions.

In some embodiments, the RF transceiver 310 is capable of transmitting the PUCCH with a power determined according to a ratio between a predetermined number of slot symbols and the number of consecutive slot symbols.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for reference signal on a downlink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
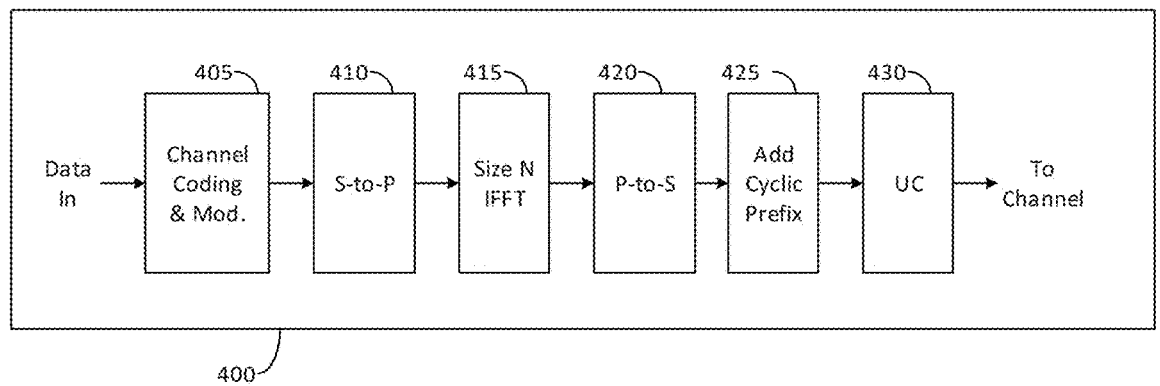
FIG. 4A illustrates a high-level diagram of an orthogonal frequency division multiple access transmit path according to embodiments of the present disclosure.
Figure 4B:
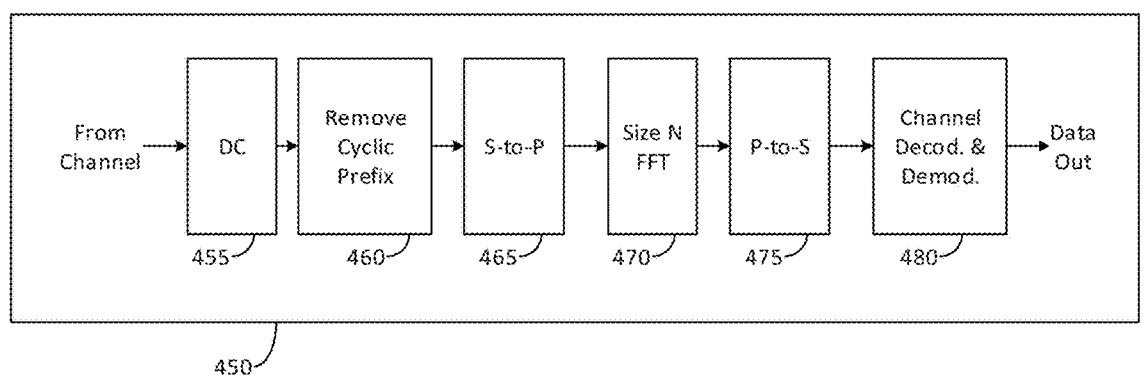
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an OFDMA communication. In FIGS. 4A and 4B, for downlink communication, the transmit path circuitry 400 may be implemented in a base station (e.g., gNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. gNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, size N inverse fast Fourier transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size n fast Fourier transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of size N may be modified according to the implementation.

Furthermore, although this disclosure is directed to an embodiment that implements the fast Fourier transform and the inverse fast Fourier transform, this is by way of illustration only and should not be construed to limit the scope of the disclosure. It may be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

DL transmissions or UL transmissions can be based on an OFDM waveform including a variant using DFT precoding that is known as DFT-spread-OFDM that is typically applicable to UL transmissions.

A reference time unit for DL signaling or for UL signaling on a cell is referred to as a slot and can include one or more slot symbols. A bandwidth (BW) unit is referred to as a resource block (RB). One RB includes a number of sub-carriers (SCs). For example, a slot can have duration of half millisecond or of one millisecond, include 7 symbols or 14 symbols, respectively, and a RB can have a BW of 180 KHz and include 12 SCs with inter-SC spacing of 15 KHz. A BW reception capability or a BW transmission capability for a UE can be smaller than a DL system BW or an UL system BW, respectively, and different UEs can be configured DL receptions or UL transmissions in different parts of a DL system BW or of an UL system BW, respectively, per slot. A slot can be a full DL slot, or a full UL slot, or a hybrid slot that includes both symbols for DL transmissions and symbols for UL transmissions, similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A gNB transmits one or more of multiple types of RS including channel state information RS (CSI-RS) and demodulation RS (DMRS). A CSI-RS is intended for UEs to perform measurements and provide channel state information (CSI) to a gNB. A DMRS is typically transmitted only in a BW of a respective PDCCH or PDSCH and a UE can use the DMRS to demodulate DCI or data information. A DL DMRS or CSI-RS can be constructed by a Zadoff-Chu (ZC) sequence or a pseudo-noise (PN) sequence.

For channel measurement, non-zero power CSI-RS (NZP CSI-RS) resources are used. For interference measurement reports (IMRs), CSI interference measurement (CSI-IM)

resources associated with a zero power CSI-RS (ZP CSI-RS) configuration are used. A CSI process including NZP CSI-RS and CSI-IM resources. A UE can determine CSI-RS transmission parameters through higher layer signaling, such as radio resource control (RRC) signaling from a gNB. Transmission instances and resources of a CSI-RS can be indicated by DL control signaling or configured by higher layer signaling. A DMRS is transmitted only in the BW of a respective PDCCH or PDSCH and a UE can use the DMRS to demodulate data or control information.

Figure 5:
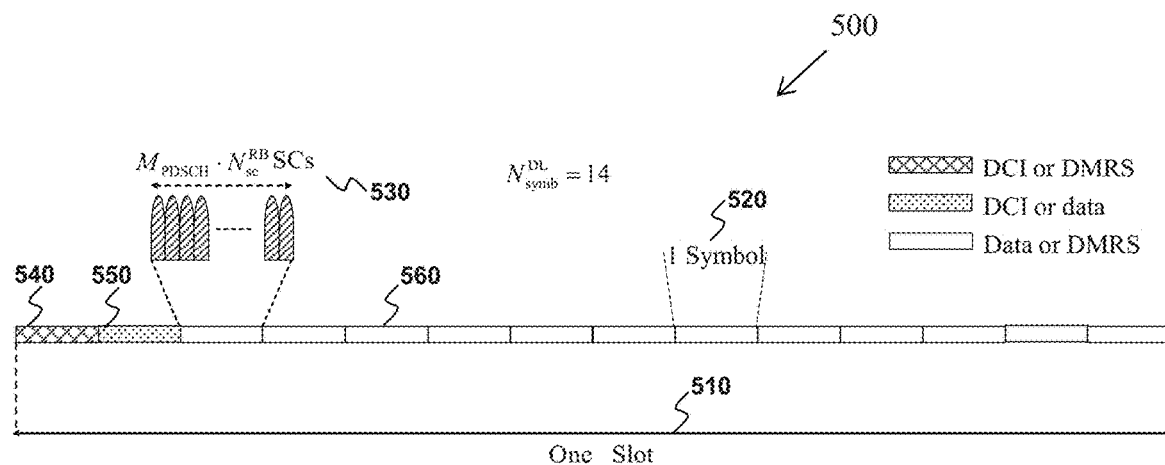
FIG. 5 illustrates an example DL slot structure for PDSCH transmission or PDCCH transmission according to embodiments of the present disclosure.

FIG. 5 illustrates an example DL slot structure 500 for transmission or PDCCH transmission according to embodiments of the present disclosure. An embodiment of the DL slot structure 500 for transmission or PDCCH transmission shown in FIG. 5 is for illustration only. Other embodiments may be used without departing from the scope of the present disclosure.

A slot 510 includes $N_{symb}^{DL}$ symbols 520 where a gNB transmits data information, DCI, or DMRS. A DL system BW includes $N_{RB}^{DL}$ RBs. Each RB includes $N_{sc}^{RB}$ SCs. For example, $N_{sc}^{RB}$=12. A UE is assigned $M_{PDSCH}$ RBs for a total of $M_{sc}^{PDSCH}=M_{PDSCH} \cdot N_{sc}^{RB}$ SCs 530 for a PDSCH transmission BW. A first slot symbol 540 can be used by the gNB to transmit DCI and DMRS. A second slot symbol 550 can be used by the gNB to transmit DCI, DMRS, or data information. Remaining slot symbols 560 can be used by the gNB to transmit data information, DMRS, and possibly CSI-RS. In some slots, the gNB can also transmit synchronization signals and system information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). When a UE simultaneously transmits data information and UCI, the UE can multiplex both in a PUSCH. UCI includes hybrid automatic repeat request acknowledgement (HARQ-ACK) information, indicating correct or incorrect detection of data transport blocks (TBs) in a PDSCH, scheduling request (SR) indicating whether a UE has data in the UE's buffer, and CSI reports enabling a gNB to select appropriate parameters for PDSCH or PDCCH transmissions to a UE.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a MIMO transmission principle, and of a rank indicator (RI) indicating a transmission rank for a PDSCH. UL RS includes DMRS and SRS. DMRS is transmitted only in a BW of a respective PUSCH or PUCCH transmission. A DMRS or an SRS can be represented by a ZC sequence or a CG sequence. A cyclic shift (CS) associated with a ZC sequence or a GC sequence can hop in time. For example, a gNB can explicitly or implicitly indicate to a UE a CS for a GC sequence that is applicable for a first DMRS transmission in a PUSCH or a PUCCH and the UE can determine a CS for subsequent DMRS transmissions in the PUSCH or the PUCCH based on a predefined CS hopping pattern. A gNB can use a DMRS to demodulate information in a respective PUSCH or PUCCH. SRS is transmitted by a UE to provide a gNB with an UL CSI and, for a TDD system, a SRS transmission can also provide a PMI for DL transmission. Additionally, in order to establish synchronization or an initial RRC connection with a gNB, a UE can transmit a physical random access channel.

Figure 6:
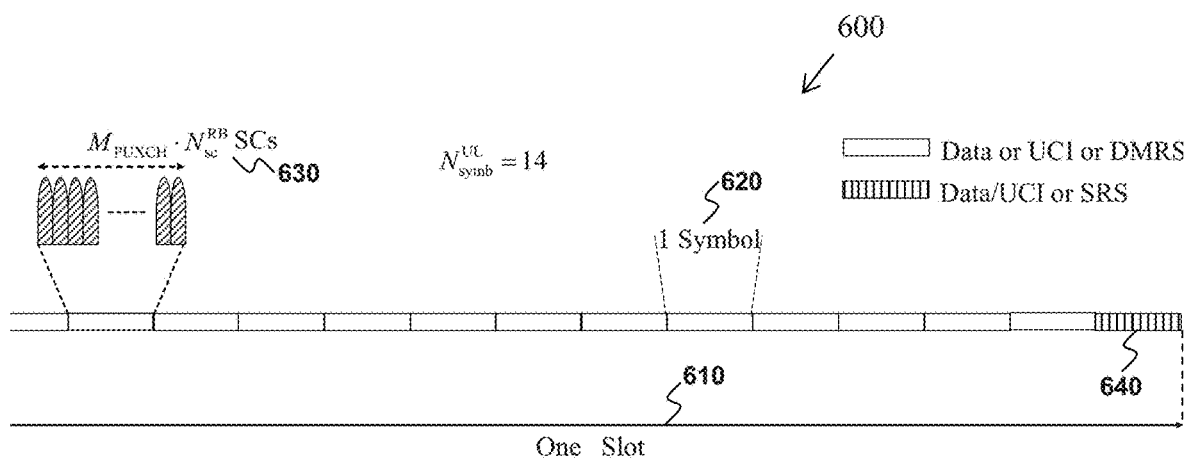
FIG. 6 illustrates an example UL slot structure for PUSCH transmission or PUCCH transmission according to embodiments of the present disclosure.

FIG. 6 illustrates an example UL slot structure 600 for PUSCH transmission or PUCCH transmission according to embodiments of the present disclosure. An embodiment of the UL slot structure 600 for PUSCH transmission or PUCCH transmission shown in FIG. 6 is for illustration only. Other embodiments may be used without departing from the scope of the present disclosure.

A slot 610 includes $N_{symb}^{UL}$ symbols 620 where a UE transmits data information, UCI, or RS including at least one symbol where the UE transmits DMRS 630. An UL system BW includes $N_{RB}^{UL}$ RBs. Each RB includes $N_{sc}^{RB}$ SCs. A UE is assigned $M_{PUXCH}$ RBs for a total of $M_{sc}^{PUXCH}=M_{PUXCH} \cdot N_{sc}^{RB}$ SCs 640 for a PUSCH transmission BW ("X"="S") or for a PUCCH transmission BW ("X"="C"). One or more last slot symbols can be used to multiplex SRS transmissions 650 (or PUCCH transmissions) from one or more UEs. A number of UL slot symbols available for data/UCI/DMRS transmission is $N_{symb}^{PUXCH}=2 \cdot (N_{symb}^{UL}-1)-N_{SRS}$. $N_{SRS}>0$ when $N_{SRS}$ last slot symbols are used SRS transmissions (or PUCCH transmissions) from UEs that overlap at least partially in BW with a PUXCH transmission BW; otherwise, $N_{SRS}=0$ Therefore, a number of total SCs for a PUXCH transmission is $M_{sc}^{PUCCH} \cdot N_{symb}^{PUXCH}$. PUCCH transmission and PUSCH transmission can also occur in a same slot; for example, a UE can transmit PUSCH in earlier slot symbols and PUCCH in later slot symbols.

A hybrid slot includes a DL transmission region, a guard period region, and an UL transmission region, similar to a special subframe in LTE. For example, a DL transmission region can contain PDCCH and PDSCH transmissions and an UL transmission region can contain PUCCH transmissions. For example, a DL transmission region can contain PDCCH transmissions and an UL transmission region can contain PUSCH and PUCCH transmissions.

A PDCCH transmission can be over a number of control channel elements (CCEs). A UE typically performs multiple PDCCH decoding operations to detect DCI formats in a TTI. The UE determines locations of CCEs for a PDCCH reception (PDCCH candidate) according to a search space function for a corresponding CCE aggregation level. A DCI format includes cyclic redundancy check (CRC) bits in order for the UE to confirm a correct detection of the DCI format. A DCI format type is identified by a radio network temporary identifier (RNTI) that scrambles the CRC.

In the following, a DCI format scheduling a PDSCH transmission to a UE is referred to as DL DCI format or DL assignment while a DCI format scheduling a PUSCH transmission from a UE is referred to as UL DCI format or UL grant.

Figure 7:
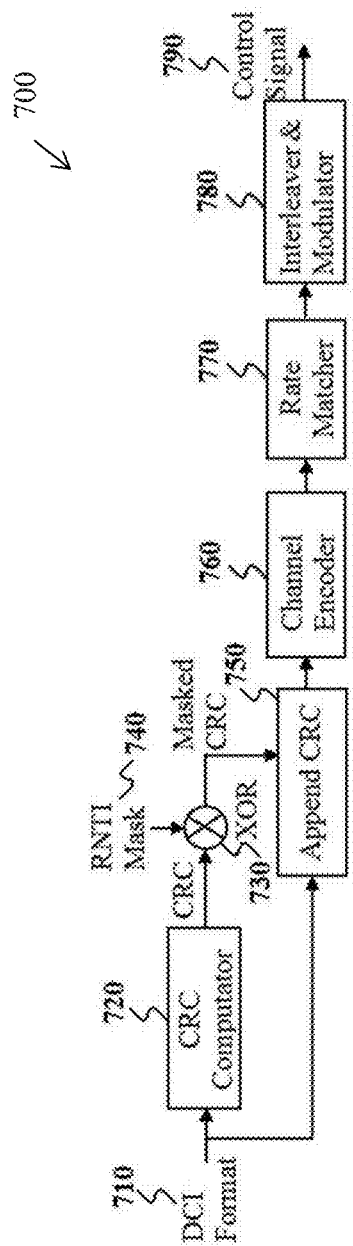
FIG. 7 illustrates an example encoding process for a DCI format according to embodiments of the present disclosure.

FIG. 7 illustrates an example encoding process 700 for a DCI format according to embodiments of the present disclosure. An embodiment of the encoding process 700 for a DCI format shown in FIG. 7 is for illustration only. Other embodiments may be used without departing from the scope of the present disclosure.

A gNB separately encodes, for example using a polar code or a tail-biting convolutional code (TBCC), and transmits each DCI format in a respective PDCCH. When applicable, a RNTI for a UE that a DCI format is intended for masks a CRC of the DCI format codeword in order to enable the UE to identify the DCI format. For example, the CRC and the RNTI can include 16 bits. Otherwise, when a RNTI is not included in a DCI format, a DCI format type indicator field can be included in the DCI format. The CRC of (non-coded) DCI format bits 710 is determined using a CRC computation unit 720, and the CRC is masked using an exclusive OR (XOR) operation unit 730 between CRC bits and RNTI bits 740. The XOR operation is defined as XOR(0,0)=0, XOR (0,1)=1, XOR(1,0)=1, XOR(1,1)=0. The masked CRC bits are appended to DCI format information bits using a CRC append unit 750. An encoder 760 performs channel coding (such as tail-biting convolutional coding or polar coding), followed by rate matching to allocated resources by rate matcher 770. Interleaving and modulation units 780 apply interleaving and modulation, such as QPSK, and the output control signal 790 is transmitted.

Figure 8:
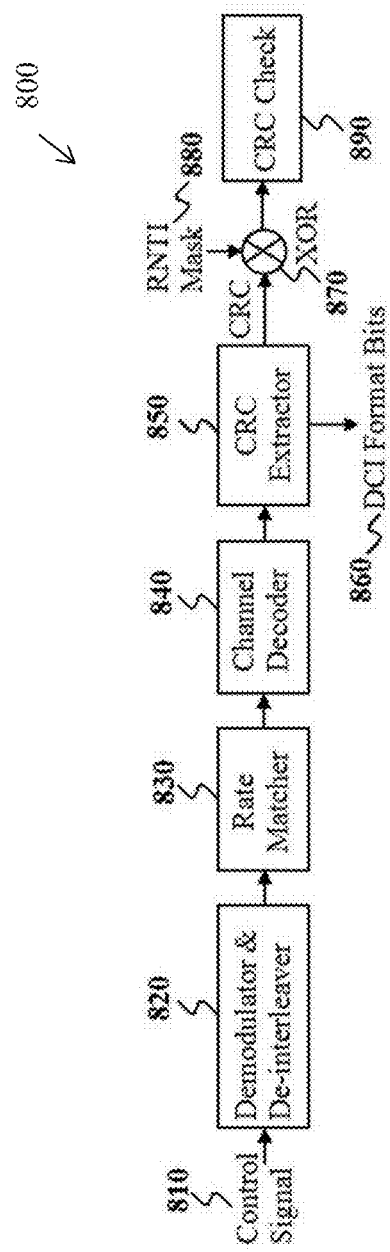
FIG. 8 illustrates an example decoding process for a DCI format for use with a UE according to embodiments of the present disclosure.

FIG. 8 illustrates an example decoding process 800 for a DCI format for use with a UE according to embodiments of the present disclosure. An embodiment of the decoding process 800 for a DCI format for use with a UE shown in FIG. 8 is for illustration only. Other embodiments may be used without departing from the scope of the present disclosure.

A received control signal 810 is demodulated and de-interleaved by a demodulator and a de-interleaver 820. A rate matching applied at a gNB transmitter is restored by rate matcher 830, and resulting bits are decoded by decoder 840. After decoding, a CRC extractor 850 extracts CRC bits and provides DCI format information bits 860. The DCI format information bits are de-masked 870 by an XOR operation with a RNTI 880 (when applicable) and a CRC check is performed by unit 890. When the CRC check succeeds (check-sum is zero), the DCI format information bits are considered to be valid. When the CRC check does not succeed, the DCI format information bits are considered to be invalid.

A PUCCH can be transmitted according to one from multiple PUCCH formats as described in LTE specification. A PUCCH format corresponds to a structure that is designed for a particular UCI payload range as different UCI payloads require different PUCCH transmission structures to improve an associated UCI BLER. For example, as described in LTE specification, PUCCH Format 1/1a/1b can be used for transmission of SR/HARQ-ACK payloads of 1 bit or 2 bits, PUCCH Format 3 can be used for transmission of HARQ-ACK/CSI/SR payloads from 2 bits to 22 bits, and PUCCH Format 4 or 5 can be used for transmission of HARQ-ACK/CSI/SR payloads above 22 bits. For PUCCH Format 3, 4, or 5, a gNB configures a UE with a set of RBs for PUCCH transmission and a DCI format scheduling a PDSCH transmission to the UE provides an index to the set of RBs for the UE to determine the RBs for the PUCCH transmission. For PUCCH Format 3 or 4, each element in the set of RBs includes one RB. For PUCCH Format 4, each element in the set of RBs can include one or more RBs.

Figure 9:
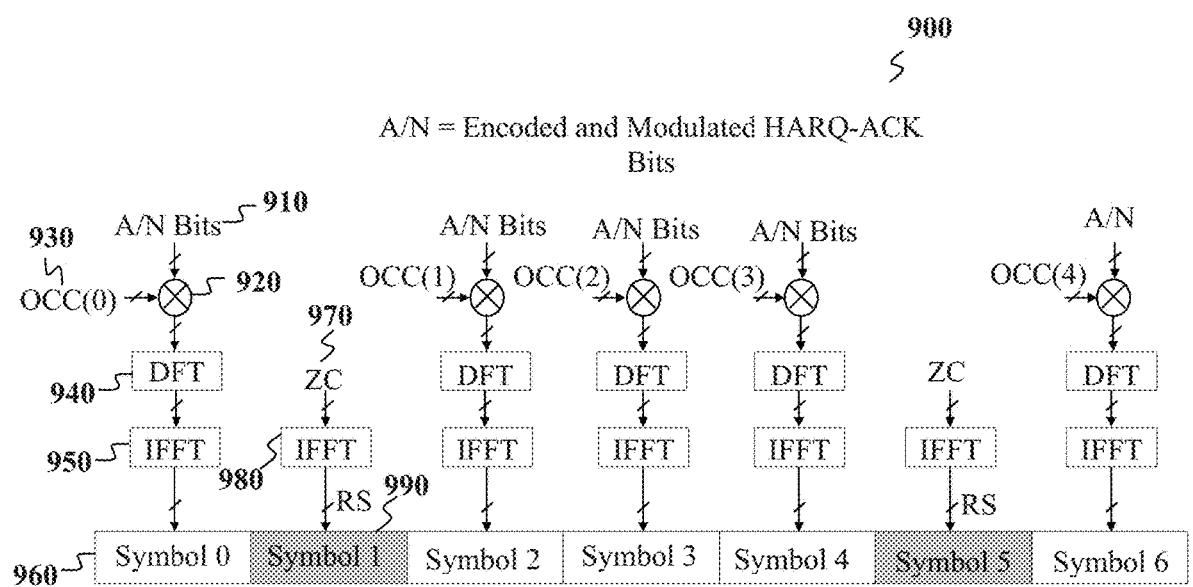
FIG. 9 illustrates an example PUCCH Format 3 structure according to embodiments of the present disclosure.

FIG. 9 illustrates an example PUCCH Format 3 structure 900 according to embodiments of the present disclosure. An embodiment of the PUCCH Format 3 structure 900 shown in FIG. 9 is for illustration only. Other embodiments may be used without departing from the scope of the present disclosure.

After encoding and modulation using respectively, for example, a (32, $O_{HARQ-ACK}$) Reed-Muller (RM) code punctured to a (24, $O_{HARQ-ACK}$) RM code and quaternary phase shift keying (QPSK) modulation (not shown for brevity), a set of same HARQ-ACK bits 910 is multiplied 920 with elements of an orthogonal covering code (OCC) 930 and is subsequently DFT precoded 940. For example, for 5 symbols carrying HARQ-ACK bits, the OCC has length 5 {OCC(0), OCC(1), OCC(2), OCC(3), OCC(4)} and can be either of $\{1, 1, 1, 1, 1\}$, or $\{1, \exp(j2\pi/5), \exp(j4\pi/5), \exp(j6\pi/5), \exp(j8\pi/5)\}$, or $\{1, \exp(j4\pi/5), \exp(j8\pi/5), \exp(j2\pi/5), \exp(j6\pi/5)\}$, or $\{1, \exp(j6\pi/5), \exp(j2\pi/5), \exp(j8\pi/5), \exp(j4\pi/5)\}$, or $\{1, \exp(j8\pi/5), \exp(j6\pi/5), \exp(j4\pi/5), \exp(j2\pi/5)\}$. The output is passed through an IFFT filter 950 and the output is then mapped to a DFT-S-OFDM symbol 960.

As the previous operations are linear, their relative order can be inter-changed. As a PUCCH is transmitted in one RB, 24 encoded HARQ-ACK bits can be transmitted in each slot and the 24 encoded HARQ-ACK bits are mapped to 12 QPSK symbols. In addition to HARQ-ACK signals, RS are transmitted in each slot to enable coherent demodulation of HARQ-ACK signals. A RS is constructed from a length-12 Constant Amplitude zero auto-correlation (CAZAC) sequence 970, such as a Zadoff-Chu (ZC) sequence or a computer generated (CG) sequence, which is passed through an IFFT 980 and mapped to another symbol 990. Multiplexing of RS from different UEs is achieved by using different cyclic shifts (CS) of a same ZC sequence. Code division multiplexing (CDM) is therefore through different OCCs across symbols and through different cyclic shifts of a ZC sequence or a CG sequence.

A PUCCH transmission power from a UE is set with an objective to achieve a reliability target for associated data by achieving a respective target received SINR at a serving cell of a gNB while controlling interference to neighboring cells. UL power control (PC) includes open-loop PC (OLPC) with cell-specific and UE-specific parameters and closed-loop PC (CLPC) corrections provided to a UE by a gNB through transmission PC (TPC) commands in respective DCI formats.

A power control formula for a UE to determine UE a PUCCH transmission power $P_{PUSCH,c}(i)$, in decibels per milliwatt (dBm), in cell c and slot i, can depend on a respective PUCCH format. For any of PUCCH formats 1/1a/1b/2a/2b/3, a UE can determine a transmission power as in equation 1 as shown:

$$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array}\right\} [\text{dBm}] \quad \text{Equation (1)}$$

For PUCCH format 4/5, a UE can determine a transmission power as in equation 2 as shown:

$$P_{PUCCH}(i) = \min\left\{\begin{array}{l} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) \end{array}\right\} [\text{dBm}] \quad \text{Equation (2)}$$

When a UE does not transmit a PUCCH, for the accumulation of TPC command for PUCCH, the UE assumes that a PUCCH transmit power $P_{PUCCH}$ is computed as in equation 3

$$P_{PUCCH}(i) = \min\{P_{CMAX,c}(i), P_{0\_PUCCH} + PL_c + g(i)\} [\text{dBm}] \quad \text{Equation (3)}$$

The parameters in equation 1, equation 2, and equation 3 are as described in LTE specification and only an outline is described below for brevity: $P_{CMAX,c}$ (i) is a maximum UE transmission power in cell c and slot i; $P_{O\_PUCCH,c}$ is a sum of a cell-specific parameter $P_{O\_NOMINAL\_PUCCH,c}$ and a UE-specific parameter $P_{O\_UE\_PUCCH,c}$ that are provided to a UE by higher layer signaling; $PL_c$ is a path loss (PL) estimate computed by the UE for cell c; h(•) is a function with values depending on a format used for the PUCCH transmission and on whether HARQ-ACK, SR, or CSI is transmitted; $\Delta_{F\_PUCCH}$(F) is provided to the UE by higher layers and the value of $\Delta_{F\_PUCCH}$ (F) depends on a respective PUCCH format (F); $\Delta_{TxD}$ (F') is non-zero if a PUCCH format F' is transmitted from two antenna ports; $M_{PUCCH,c}$(i) is a PUCCH transmission BW in RBs in cell c and slot i; $\Delta_{TF,c}$(i) is determined by a spectral efficiency of a PUCCH transmission; $g(i)=g(i-1)+\delta_{PUCCH}$(i) is a function accumulating a TPC command $\delta_{PUCCH}$(i) in a DCI Format 3/3A or in a DCI format scheduling PDSCH reception and g(0) is a value after reset of accumulation.

One important characteristic of so-called 5G networks is the support of services having materially different characteristics such as in a target latency or reliability or in an operating carrier frequency. For example, services requiring low latency can be associated with transmission of small data TBs that can support a fast decoding time and HARQ-ACK transmission in a last symbol of a slot. For example, operation in high carrier frequencies, such as in millimeter wave bands, can be associated with large transmission BWs and PUCCH transmissions over a large BW and in only one symbol of a slot.

A PUCCH transmitted over only one or two symbols of a slot is referred to PUCCH with short duration or simply as short PUCCH. Conversely, mobile broadband (MBB) applications are typically associated with cellular carrier frequencies below 6 GHz, support of large data TBs, and requirements for coverage over large cell sizes necessitating PUCCH transmissions over substantially all symbols of an UL part of a slot. A PUCCH transmitted over substantially all symbols of a slot that are available for UL transmissions is referred to PUCCH with long duration or simply as long PUCCH.

Although supporting PUCCH transmissions over an UL slot can follow existing principles, new designs are required for the PUCCH structures in case of a hybrid slot due to a variability in a number of available symbols for the PUCCH transmission. This variability can be due to several factors including whether or not a slot is a full UL slot or a hybrid slot or whether or not some slot symbols are used for other transmissions, such as PUCCH transmissions having a short duration, SRS, or PRACH. For a hybrid slot, this variability is also due to a variable number of slot symbols used for DL transmissions such as for DL control channels or due to a variable GP duration. The GP duration, in number of slot symbols, can be semi-statically determined and informed, for example, by system information or be dynamically indicated to a UE.

New designs are also required for determining a PUCCH transmission power that incorporates variability in a number of slot symbols that are available for the PUCCH transmission. Further, as a UCI size may increase, due to support of BMI or HARQ-ACK per code block, instead of transport block, a number of resources required for respective PUCCH transmissions can also increase and means to reduce respective overhead need to be consider in order to avoid reductions in an UL system throughput.

Another important characteristic of so-called 5G networks is a reduction of periodic signaling in order to dynamically enable multiplexing of different services in time and dynamic network adaptation to various types of traffic. This poses a challenge for the support of some functionalities that rely on predetermined resource availability for periodic transmissions including a capability for UEs to request scheduling through transmissions of respective SRs to a gNB.

As a UE cannot be assumed to always know a slot structure for a PUCCH transmission, corresponding information needs to be provided by a DCI format triggering to the UE the PUCCH transmission in the slot. Moreover, for improving a multiplexing efficiency for PUCCH transmissions from different UEs, a gNB can further indicate to a UE whether duration for a PUCCH transmission from the UE may be a short one or a long one. Also, as a number of slot symbols available for a PUCCH transmission in a slot can take many values, it can be beneficial for a gNB or a UE complexity to limit a number of possible structures for a long PUCCH transmission. Therefore, there is a need to define long PUCCH structures for multiple numbers of available symbols for a long PUCCH transmission.

There is another need for indicating duration or a format for a PUCCH by a DCI format triggering the PUCCH transmission.

There is another need to increase a multiplexing capacity of PUCCH transmissions over one or multiple RBs.

There is another need to determine a power for transmitted PUCCH transmission over a variable number of symbols.

For brevity, a PUCCH having a long duration is referred to as long PUCCH and a PUCCH having a short duration is referred to as short PUCCH.

In some embodiments, transmission of a long PUCCH is considered when a number of slot symbols available for the long PUCCH transmission can be variable.

In one example, a long PUCCH is transmitted until a last symbol of an UL slot or of a hybrid slot and duration variability only occurs at the beginning of a slot. An associated requirement for consecutive transmission of a long PUCCH from a given symbol in a slot until a last symbol of the slot is that transmissions of short PUCCH, or SRS, or PRACH are not configured to occur in frequency resources (RBs) used for the transmission of the long PUCCH. This requirement can be achieved either by implementation, where a gNB scheduler selects non-overlapping frequency resources for long PUCCH transmissions and other UL transmissions, or by explicit configuration where non-overlapping frequency resources are indicated, either by system information or by a DCI format triggering a long PUCCH transmission or by a combination, for long PUCCH transmissions and for the other UL transmissions. For example, a DCI format that a UE detects and, in response to the detection, the UE transmits a long PUCCH in a slot, can include a field indicating a slot and a first symbol and a number of symbols in the slot that the UE can assume as being available for the PUCCH transmission. For example, the field can include 2 bits mapping to possible values of 14, 7, 4, or 2 symbols available for the PUCCH transmission. Therefore, a dynamic indication of the number of symbols for a PUCCH transmission can also implicitly indicate use of a short PUCCH or a long PUCCH format for a given UCI payload. For PUCCH transmissions configured by higher layer signaling, the higher layer signaling configures the PUCCH transmission resources including one or more RBs, a first symbol and a duration.

Instead of having separate fields to indicate frequency resources (sub-carriers) and time resources (slot symbols) for a long PUCCH transmission, a DCI format can include a single field that jointly indicates frequency and time resources for the long PUCCH transmission. Depending on a structure for a long PUCCH, the frequency resources can correspond to one or more RBs or can correspond to an RB and a number of sub-carriers within or starting from the RB. For example, the frequency resources can correspond to a group of first six sub-carriers or a group of last six sub-carriers in a RB of twelve sub-carriers. Available frequency resources can be configured by higher layer signaling to a UE, in terms of an RB index and a number of RBs that can be consecutive in frequency, and a field in a DCI format can indicate one frequency resource from the configured set of frequency resources. When a long PUCCH is transmitted with frequency hopping over a first frequency resource and a second frequency resource, higher layer signaling can configure a first RB index and a second RB index for the first frequency resource and for the second frequency resource, respectively, or the UE can determine the second frequency resource from the first frequency resource, for example the second RB index can be equal to a largest RB index in a system BW for the UE minus the first RB index.

In case of a full UL slot, a long PUCCH can be transmitted from a first symbol of the full UL slot. In case of a hybrid slot, a first symbol for a long PUCCH transmission can depend on a number of slot symbols used for DL transmissions, such as for example for DL control channels and various DL RS, and on a number of slot symbols used for a GP. For example, a number of first symbols in a hybrid slot that can be unavailable for a long PUCCH transmission can range from 2 (in case of 1 slot symbol for DL control and 1 slot symbol for GP) to substantially the whole slot except for a few symbols at the end of the slot (in case of several slot symbols used for DL transmissions and a large number of GP symbols).

In one example, for transmission of a long PUCCH in a hybrid slot, a UE assumes that a maximum number of slot symbols are used for transmissions of DL control channels. This maximum number can be predetermined in a system operation for a system BW associated with a hybrid slot or can be configured to a UE by a gNB using UE-common RRC signaling, such as a master information block or a system information block, or by UE-specific RRC signaling. A UE can then determine a total number of available symbols per hybrid slot for transmission of a long PUCCH based on a total of a number of slot symbols used for DL transmissions and a number of slot symbols used for GP. In a second example, a UE determines a number of slot symbols used for transmissions of DL control channels in a slot from DL control signaling in the slot that includes an indication for the number of slot symbols used for transmissions of DL control channels in the slot and can also include additional information. In a third example, the slot structure is informed to a UE by a DCI format or by higher layer signaling that configures a long PUCCH transmission.

To enable a gNB to efficiently utilize resources allocated to long PUCCH transmissions and short PUCCH transmissions, a DCI format scheduling a transmission of a DL data channel that is associated with a transmission of corresponding HARQ-ACK information (or, in general, UCI) in a PUCCH can include a field indicating whether the UE shall transmit a long PUCCH or a short PUCCH. For example, when only a few UEs transmit PUCCHs in a slot and all UEs can use a long PUCCH or a short PUCCH, it can be disadvantageous for UL spectral efficiency to use both resources for long PUCCH transmissions and resources for short PUCCH transmissions. To enable dynamic indication to a UE for a PUCCH transmission duration (short or long), a DCI format scheduling an associated PDSCH transmission to the UE can indicate the PUCCH transmission duration (short PUCCH or long PUCCH), for example through a 1-bit field. Further, when two different PUCCH structures (formats), either for long PUCCH or for short PUCCH, can be used to convey a HARQ-ACK payload, the DCI format can also indicate the PUCCH format, for example through a 1-bit field. The fields indicating to a UE whether the UE shall use a short PUCCH or a long PUCCH and a respective PUCCH format can be separate fields or can be provided by a field indicating a general resource configuration that can also indicate a first symbol, a number of symbols, or a set of one or more RBs for a PUCCH transmission. When a UE transmits HARQ-ACK information in response to the UE detecting a number of DCI formats, the UE can determine a PUCCH transmission duration (short or long) and a PUCCH format for the HARQ-ACK transmission based on the indication by respective fields in at least a last of the number of DCI formats.

Figure 10:
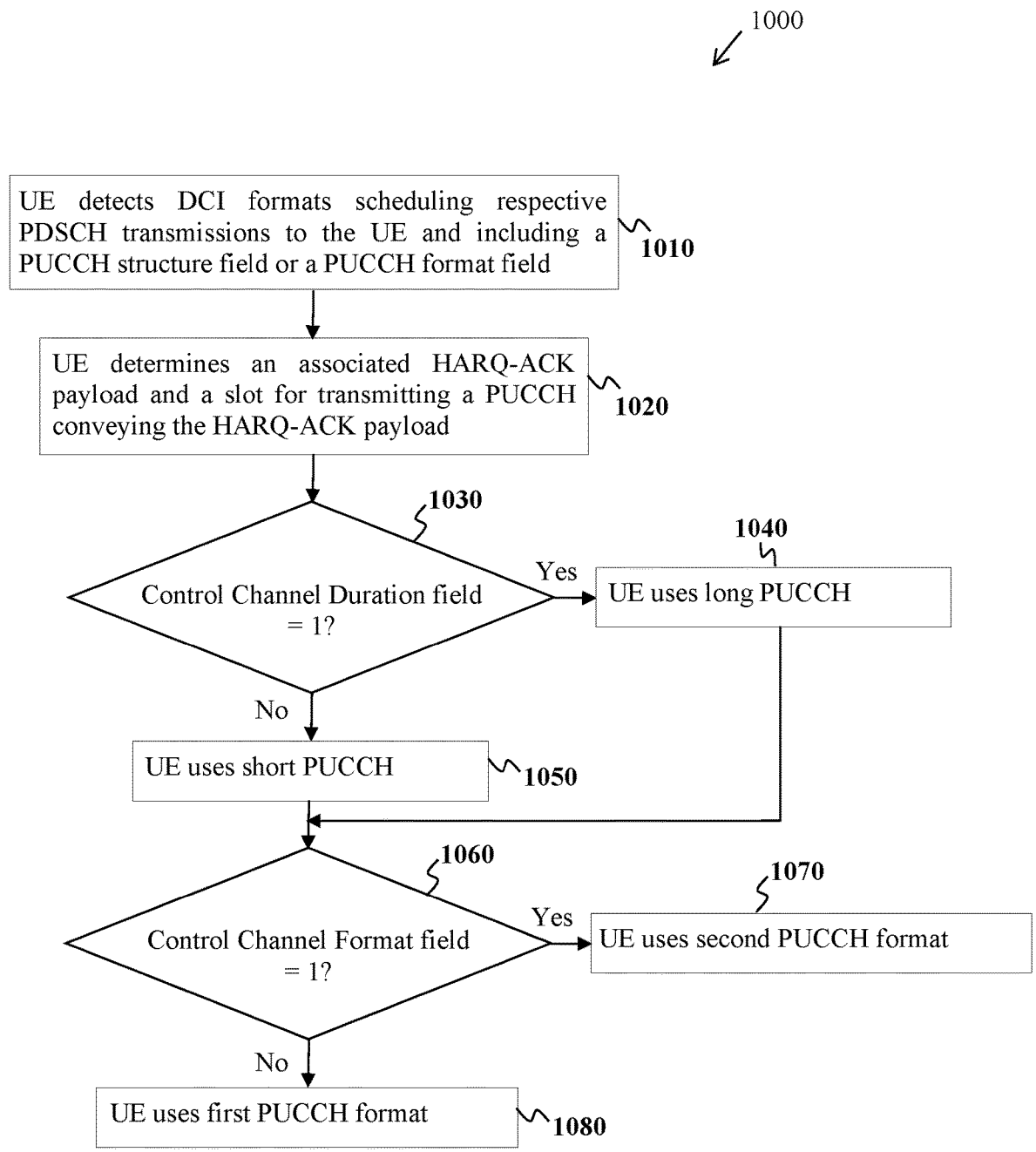
FIG. 10 illustrates an example process for a UE according to embodiments of the present disclosure.

FIG. 10 illustrates an example process 1000 for a UE according to embodiments of the present disclosure. An embodiment of the process 1000 shown in FIG. 10 is for illustration only. Other embodiments may be used without departing from the scope of the present disclosure.

A UE detects DCI formats scheduling respective PDSCH transmissions to the UE 1010. The DCI formats include a PUCCH transmission duration field or a PUCCH format field. The DCI formats can be received in different slots of a same cell, or in a same slot in different cells, or both. The DCI formats include a field indicating a slot where a UE is expected to transmit a PUCCH conveying UCI, such as HARQ-ACK information, in response to the detection of the DCI formats. Based on the detected DCI formats and associated fields indicating a slot for HARQ-ACK transmission in response to the detection of the DCI formats, the UE determines an HARQ-ACK payload and a slot for a transmission of a PUCCH conveying the HARQ-ACK information 1020. The DCI formats also convey a "PUCCH duration" field, for example as part of a configuration indicated by a resource indication field, indicating duration for the PUCCH transmission (short PUCCH or long PUCCH). The UE examines whether the "PUCCH duration" field has a binary value of 1 (or 0) 1030.

When the "PUCCH duration" field has a binary value of 1, the UE uses a long PUCCH to transmit the HARQ-ACK information 1040; otherwise, when the "PUCCH duration" field has a binary value of 0, the UE uses a short PUCCH to transmit the HARQ-ACK information 1050. The DCI formats can also convey a "PUCCH format" field indicating a format for the PUCCH. The UE examines whether the "PUCCH format" field has a binary value of 1 (or 0) 1060. When the "PUCCH format" field has a binary value of 1, the UE uses a first PUCCH format to transmit the HARQ-ACK information 1070; otherwise, when the "PUCCH Format" field has a binary value of 0, the UE uses a second PUCCH format to transmit the HARQ-ACK information 1080.

For a PUCCH conveying small HARQ-ACK payloads, CDM of transmissions from UEs in same time-frequency resources can be used to reduce an overhead associated with such PUCCHs. This is a similar principle to the CDM used for PUCCH Formats 1/1a/1b and PUCCH Format 3 in LTE. However, when a number of slot symbols that is available for PUCCH transmission is variable, associated structures enabling CDM in the time domain for PUCCH transmissions from different UEs need to also be variable to reflect the variable number of symbols. To avoid variable multiplexing capacity per slot, particularly when a long PUCCH transmission can span multiple slots, CDM in the time domain can also be disabled. Then, UE multiplexing can be limited to CDM in the frequency domain either by cyclic shifts when both DMRS and UCI transmissions are through CAZAC sequences for example as for PUCCH formats 1/1a/1b/2 in LTE or by OCC in the frequency domain for example as for PUCCH format 5 in LTE.

It is also possible, at least for multi-slot PUCCH transmission when it is over a different number of symbols in different slots, for a number of available OCCs to be predetermined in a system operation or be indicated by a gNB to a UE, for example by higher layer signaling, and be same for all possible numbers of symbols per slot for a PUCCH transmission. The UE can determine an OCC pair to apply to respective DMRS and UCI transmissions of the PUCCH from the number of OCCs regardless of an actual number of symbols the UE uses for DMRS transmission or for UCI transmission in a slot. The OCC used for DMRS transmission or for UCI transmission can be determined according to a number of symbols for a respective transmission but the number of OCCs is not determined according to a number of symbols for the respective transmission and does not increase as the number of symbols increases. For example, for a PUCCH transmission spanning multiple slots, absence of frequency hopping within a slot, and a minimum of 4 symbols available for PUCCH transmission in a slot where 2 symbols are used for DMRS transmission and 2 symbols are used for UCI transmission, a UE can assume that 2 OCCs are available even when a number of symbols available for DMRS transmissions and for UCI transmissions in the slot is larger than 2 and a number of OCCs larger than 2 exists.

For example, a UE can assume that only the first 2 OCCs are available for the DMRS transmission and for the UCI transmission of the PUCCH. This can result to a reduced UE multiplexing capacity per RB for PUCCH transmissions, due to limiting a number of used OCCs to be smaller than a number of available OCCs corresponding to a number of symbols for DMRS transmission or UCI transmission in a same set of one or more RBs, but can ensure than a UE does not need to use different RBs to transmit PUCCH in different slots of a multi-slot PUCCH transmission.

For a given long PUCCH format, a UE can determine a corresponding structure in a slot based on a determination of a number of symbols available for transmission of a respective PUCCH in the slot. To reduce a size of a resource set that includes the possible numbers of slot symbols that can be available for long PUCCH transmissions in a slot, certain numbers can be excluded and then a structure corresponding to a next smaller number can be used. For example, possible structures for a long PUCCH format can be limited to ones corresponding to an even number of available symbols in a slot and can be further limited to not supporting numbers below a predetermined number such as 4. For example, possible structures for a long PUCCH format can be limited to ones corresponding to 14, 7, and 4 available symbols in a slot as approximately differ by a power of 2 and represent a constant increase (or decrease) in dB (about 3 dB). For example, when a number of symbols available for transmission of a long PUCCH in a slot is 9, a structure corresponding to 7 available symbols is used for the long PUCCH transmission.

Figure 11:
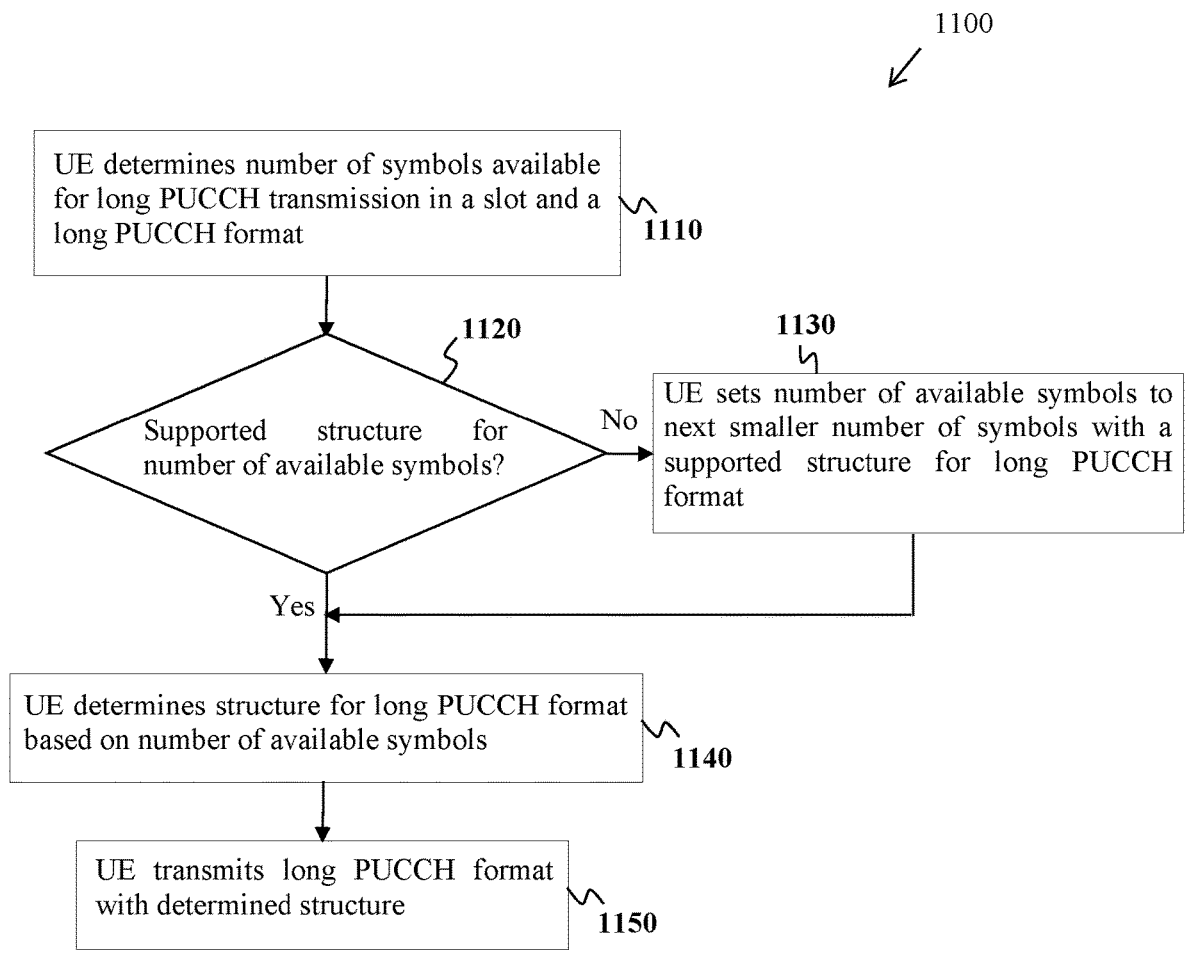
FIG. 11 illustrates another example process for a UE according to embodiments of the present disclosure.

FIG. 11 illustrates another example process 1100 for a UE according to embodiments of the present disclosure. An embodiment of the process 1100 shown in FIG. 11 is for illustration only. Other embodiments may be used without departing from the scope of the present disclosure.

A UE determines a number of available symbols (first symbol and duration) for a long PUCCH transmission in a slot and a PUCCH format 1110. The UE examines whether there is a supported structure for the long PUCCH format for the number of available symbols 1120. When there is not, the UE sets the number of available symbols to next smaller number of symbols with a supported structure for the long PUCCH format 1130. The UE subsequently determines a structure for the long PUCCH format based on number of available symbols 1140. The UE transmits the long PUCCH format using the determined structure 1150.

Exemplary structures for a long PUCCH using a format based on PUCCH Format 1/1a/1b or based on PUCCH Format 3 of LTE are subsequently considered.

For a long PUCCH using CDM for transmissions from multiple UEs in same frequency resources over a same number of slot symbols, a variable OCC length is required to multiplex UCI and DMRS transmissions. For example, in case of frequency hopping, when a full UL slot of 14 symbols is used for transmissions of a long PUCCH, UCI and DMRS can be multiplexed per 7 symbols in two parts of an UL BW. When a hybrid slot of 12 symbols is used for transmissions of a long PUCCH, UCI and DMRS can be multiplexed per 6 symbols in two parts of an UL BW but a different OCC length is needed either for the UCI transmission or for the DMRS transmission.

Similar, when a hybrid slot of 8 symbols is used for long PUCCH transmissions, UCI and DMRS can be multiplexed per 4 symbols in two parts of an UL BW but a different OCC length is needed either for the UCI transmission or for the DMRS transmission. A smallest duration for a transmission of a long PUCCH can be two symbols that include one symbol for DMRS transmission and one symbol for UCI transmission in case of no frequency hopping (the long PUCCH is then same as a short PUCCH) or four symbols that include one pair of {DMRS, UCI} symbols for transmission in a first part of a system BW and a second pair of {DMRS, UCI} symbols for transmission in a second part of a system BW.

Figure 12:
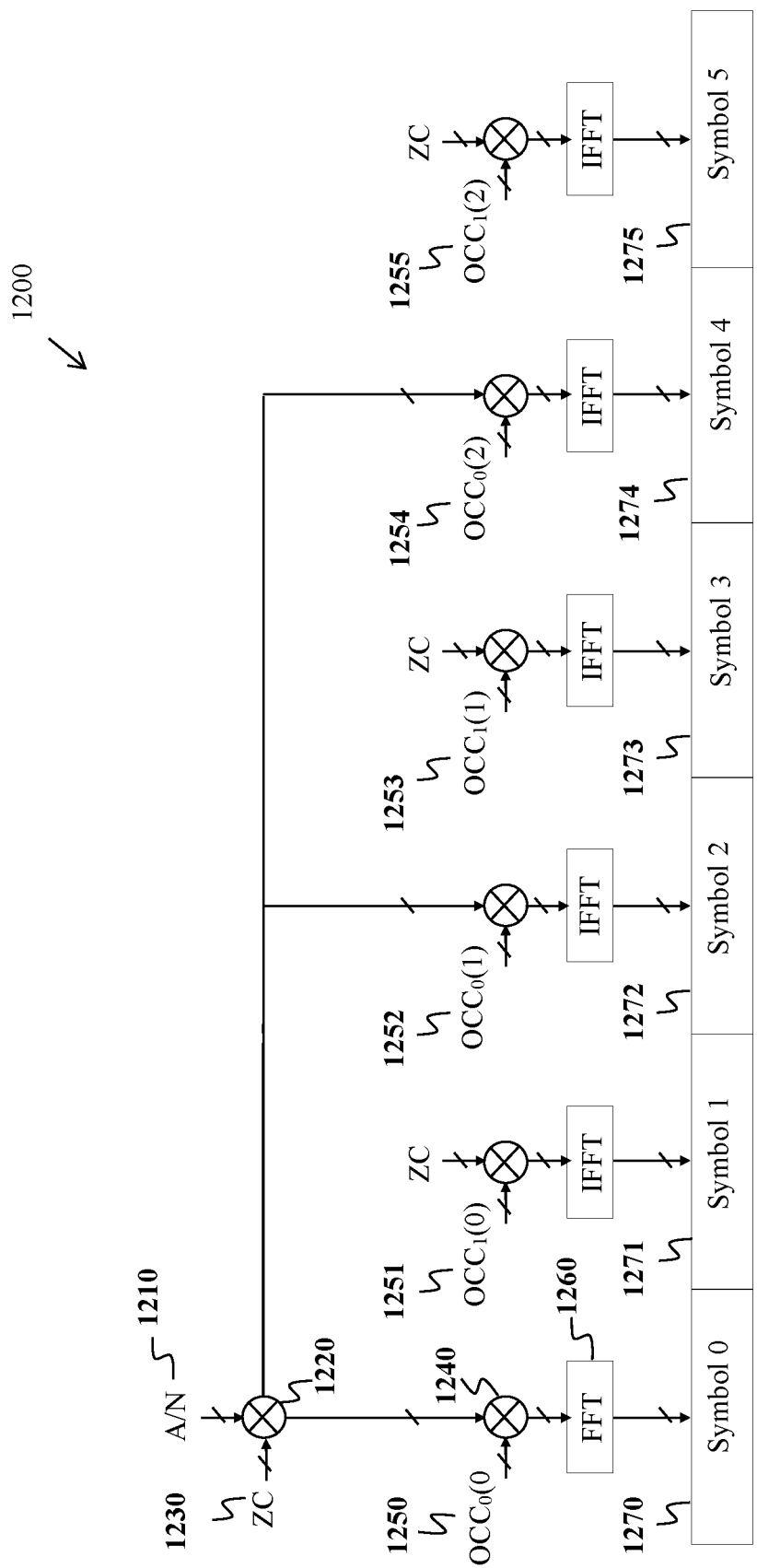
FIG. 12 illustrates an example first six symbols for a long PUCCH format transmission according to embodiments of the present disclosure.

FIG. 12 illustrates an example first six symbols for a long, PUCCH format transmission 1200 according to embodiments of the present disclosure. An embodiment of the first six symbols for a long PUCCH format transmission 1200 shown in FIG. 12 is for illustration only. Other embodiments may be used without departing from the scope of the present disclosure.

HARQ-ACK bits 1210 modulate 1220 a sequence 1230, such as a ZC sequence, an output is subsequently multiplied 1240 by an element 1250, 1252, and 1054 of a first length 3 OCC, such as {1, 1, 1}, or {1, exp(j2π/3), exp(j4π/3)}, or {1, exp(j4π/3), exp(j2π/3)}, respective outputs are filtered by an inverse fast Fourier transforms (IFFT), such as IFFT 1260, and transmitted in respective symbols that are symbol 0 1270, symbol 2 1272, and symbol 4 1074. A ZC sequence is also multiplied by an element 1251, 1253, and 1255 of a second length 3 OCC, respective outputs are filtered by an IFFT and transmitted in respective symbols that are symbol 1 1271, symbol 3 1273, and symbol 5 1275 to serve as RS. The first OCC can be same as the second OCC.

The location of symbols used to convey HARQ-ACK information and the location of symbols used to convey RS can be exchanged, that is, symbols 0, 2 and 4 can be used to convey RS and symbols 1, 3, and 5 can be used to convey HARQ-ACK information. Placing a symbol used for RS transmission prior to a symbol used for HARQ-ACK information transmission can enable earlier channel estimation and somewhat decrease a time required for a gNB receiver to detect the HARQ-ACK information. The transmission in the second six symbols can have a same structure as for the first six symbols and occur at a different part of an UL system BW.

An advantage of the structure in FIG. 12 is that by interlacing symbols used for HARQ-ACK transmission and symbols used for RS transmission, a channel variation can be fully captured. Moreover, the structure is scalable as a similar structure can apply in case of 10 total transmission symbols of 8 total transmission symbols by removing the last one symbol or the last two symbols from the structure in FIG. 12. For an odd number of symbols for transmission in one part of an UL BW, one more symbol can be used for HARQ-ACK transmission or for RS transmission in both UL BW parts or one more symbol can be used for HARQ-ACK transmission in first UL BW part and one more symbol can be used for RS transmission in second UL BW part. The OCCs used can be adjusted to reflect a number of symbols used for HARQ-ACK transmission or for RS transmission.

For example, for a long PUCCH transmission over 10 symbols where 5 symbols are transmitted in a first UL BW part and another 5 symbols are transmitted in a second UL BW part, a length-2 OCC of {1, 1} or {1, −1} can be used for the signal transmitted in 2 symbols (this determines the time-domain UE multiplexing capacity based on OCCs). For example, for a long PUCCH transmission over 8 symbols where 4 symbols are transmitted in a first UL BW part and another 4 symbols are transmitted in a second UL BW part, a length-2 OCC of {1, 1} or {1, −1} can be used for both HARQ-ACK transmission and RS transmission. As previously mentioned, UE multiplexing in the time domain can also be disabled to avoid a complexity associated with a variable length OCC and then a respective multiplication by elements of an OCC can be omitted (equivalent to each OCC value being equal to 1 as illustrated in FIG. 12).

For UCI payloads larger than 2 bits, structures similar to PUCCH Format 2, PUCCH Format 3, PUCCH Format 4, or PUCCH Format 5 from LTE can be used for a long PUCCH. To address a variable number of slot symbols that can be available for a long PUCCH transmission based on the PUCCH Format 3 structure, modifications to the PUCCH Format 3 structure are needed in case PUCCH Format 3 with variable OCC length is supported. For a long PUCCH transmission based on the PUCCH Format 4 structure or on the PUCCH Format 5 structure, any reduction in a number of available symbols for transmission is directly obtained from symbols used to transmit UCI as there can be only one RS symbol in each part of the BW where the long PUCCH is transmitted. The same applies for a long PUCCH transmission based on the PUCCH Format 2 structure by having only one RS symbol in each part of the BW where the long PUCCH is transmitted.

Figure 13:
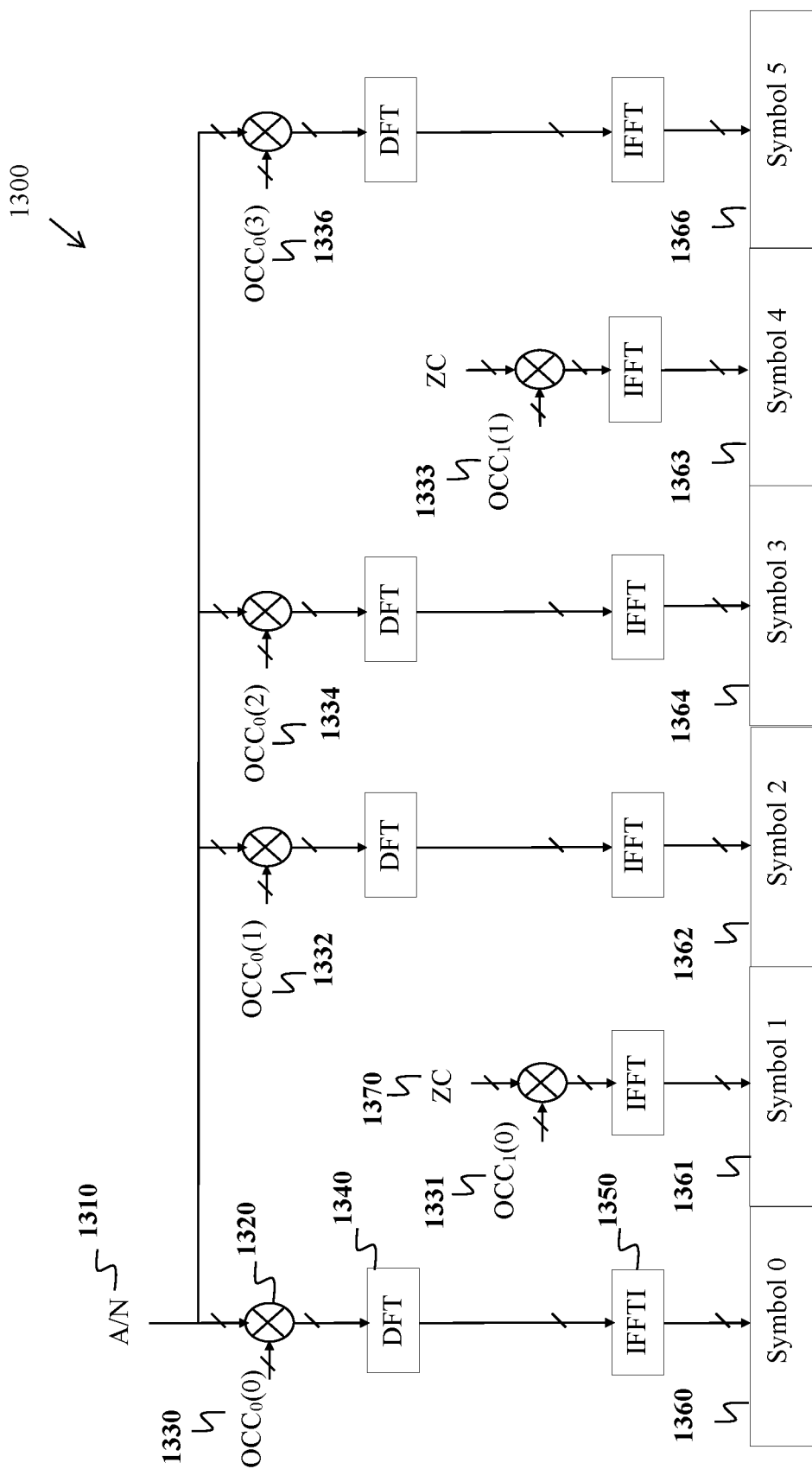
FIG. 13 illustrates another example first six symbols for a long PUCCH format transmission according to embodiments of the present disclosure.

FIG. 13 illustrates another example first six symbols for a long PUCCH format transmission 1300 according to embodiments of the present disclosure. An embodiment of the first six symbols for a long PUCCH format transmission 1300 shown in FIG. 13 is for illustration only. Other embodiments may be used without departing from the scope of the present disclosure.

Encoded and modulated HARQ-ACK bits 1310 are multiplied 1320 by an element 1330, 1332, 1334, and 1336 of a first length 4 OCC, such as {1, 1, 1, 1}, or {1, −1, 1, −1}, or {1, 1, −1, −1} or {1, −1, −1, 1}, respective outputs are filtered by a discrete Fourier transform (DFT), such as DFT 1340, followed by an IFFT, such as IFFT 1350, and transmitted in respective symbols that are symbol 0 1360, symbol 2 1362, symbol 3 1364, and symbol 5 1366. A ZC sequence 1370 serving as RS is multiplied by an element 1331 and 1333 of a second length 2 OCC, such as {1, 1} and {1, −1}, respective outputs are filtered by an IFFT and transmitted in respective symbols that are symbol 1 1361 and symbol 4 1363 The transmission in the second six symbols can have a same structure as for the first six symbols and occur at a different part of an UL system BW.

When a number of symbols in a hybrid slot for transmission of a long PUCCH further decreases, to accommodate a respective loss in a link budget, a number of frequency resources can increase for example from 1 RB to 2 RBs or more as it is further subsequently discussed. For example, when an available number of slot symbols for a PUCCH transmission is reduced from 14 to 6 or 8, 2 RBs can be used, while when the available number of slot symbols is reduced to 4, 4 RBs can be used. This can avoid multi-slot transmission for a long PUCCH from a UE when the UE is not power limited.

In one example, a gNB can provide an indication to a UE for a number of RBs for the UE to transmit a long PUCCH using a DCI format scheduling one or more PDSCH transmissions that the UE transmits the HARQ-ACK information in response to their reception.

In another example, as such a number of RBs can depend on a number of HARQ-ACK information bits transmitted by a UE, the UE can determine the number of RBs as the minimum number of RBs resulting to a largest code rate for the UCI transmission (including CRC bits) that is smaller than or equal to a code rate that the gNB configures to the UE in advance by higher layer signaling or is predetermined in the system operation. For example, when a gNB configures a UE with a set of four RBs and a DCI format scheduling a PDSCH transmission to the UE indicates a second RB from the set of four RBs, the UE uses an additional RB consecutive to the second RB when a code rate for transmission only in the second RB is larger than a configured code rate and a code rate for transmission in both the second RB and the additional RB is smaller than or equal to the configured code rate.

In another example, a UE can determine a number of RBs from a number of symbols used for a long PUCCH transmission where, for example, one RB can be used when the transmission is over more than 10 symbols, two RBs can be used when the transmission is over 7 to 10 symbols, and three or four RBs can be used when the transmission is over 4 to 6 symbols. For example, a gNB can configure a UE with a number of sets of RBs, wherein each set has a same number of elements, for a respective number of ranges for PUCCH transmission symbols, an element in a first set can correspond to a same or different number of RBs than an element with a same index in a second set, and the UE can interpret an indication in a DCI format (scheduling a PDSCH transmission to the LE) for the RBs to use in a PUCCH transmission to be from the set of RBs that corresponds to the number of PUCCH transmission symbols.

In another example, a gNB configures a UE a code rate for HARQ-ACK transmission in a PUCCH and multiple sets of RBs, wherein each set has a same number of elements. A DCI format scheduling a PDSCH transmission to the UE includes an index field to an element of a set of RBs from the multiple sets of RBs. The UE determines the set of RBs and the element of the set of RBs as the one resulting to a largest code rate for the HARQ-ACK information that is smaller than or equal to the configured code rate.

In order to improve a UE multiplexing capacity when using a long PUCCH, having for example a similar format to an UL data channel (PUSCH) such as LTE PUCCH Format 4, spatial multiplexing of transmissions from different UEs can apply. To enable spatial multiplexing, orthogonal DMRS multiplexing is required. In a first example, a CS and OCC value indication (or only a CS value indication when for example when there is only one RS per BW part where the long PUCCH is transmitted) for a DMRS transmission can be included in a DCI format indicating a resource for the long PUCCH transmission (that is, the CS value can be part of the PUCCH resource indication—CS hopping can also apply for subsequent DMRS transmissions). Then, a DCI format scheduling a PDSCH transmission to a UE includes a CS and OCC configuration (or only a CS configuration) for the UE to apply to a DMRS transmission in a PUCCH while a DCI format scheduling a PUSCH transmission to a UE includes a CS and OCC configuration (or only a CS configuration) for the UE to apply to a DMRS transmission in a PUSCH. In a second example, a gNB can configure a UE through higher layer signaling, such as UE-specific RRC signaling, a CS and OCC value (or only a CS value) for DMRS transmission in a PUCCH. In a third example, a UE can implicitly determine a CS and OCC value (or only a CS value) based on, for example, a C-RNTI that a gNB assigns to the UE.

For example, for a total of $N_{tot}$ CS and OCC values, a UE can determine a CS and OCC value for a ZC sequence or a CG sequence serving for DMRS as (C-RNTI)mod $N_{tot}$ where C-RNTI is the C-RNTI value the gNB configures to the UE and 'mod' is the modulo operation. In case a UE transmits a PUCCH from multiple antennas, each of the above CS and OCC determinations can apply for a DMRS transmission from a first antenna and a CS and OCC value for a DMRS transmission from remaining antennas can be determined with respect to the CS and OCC value for the first antenna. For example, for two UE transmitter antennas, a CS and OCC value for the second antenna can be determined as (C-RNTI+$N_{tot}$/2)mod $N_{tot}$.

Figure 14:
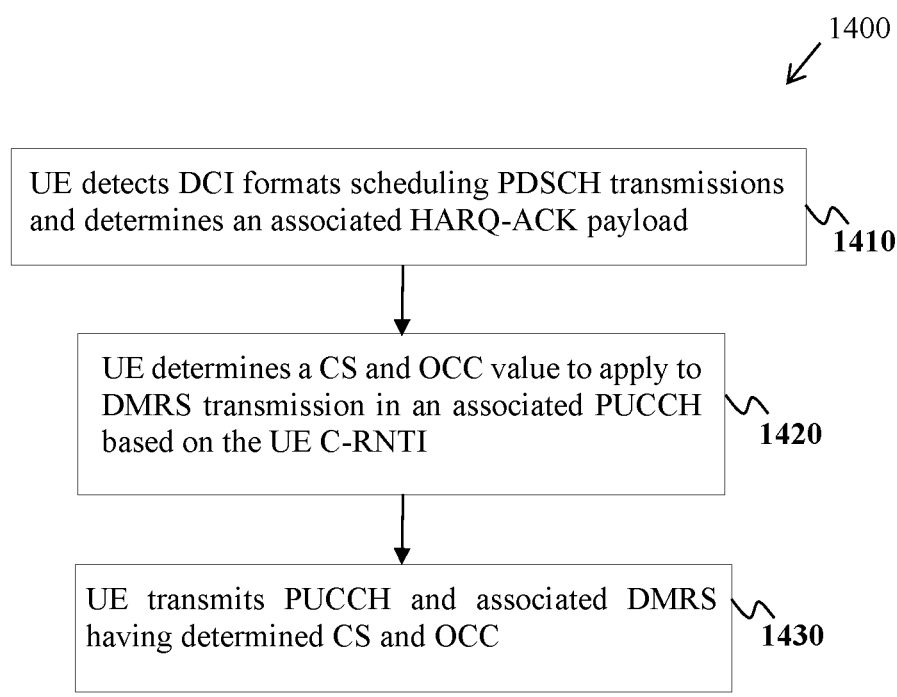
FIG. 14 illustrates yet another example process for a UE according to embodiments of the present disclosure.

FIG. 14 illustrates yet another example process 1400 for a UE according to embodiments of the present disclosure. An embodiment of the process 1400 shown in FIG. 14 is for illustration only. Other embodiments may be used without departing from the scope of the present disclosure.

A UE detects DCI formats scheduling PDSCH transmissions and determines an associated HARQ-ACK payload 1410. The HARQ-ACK payload corresponds to a use of a PUCCH format where encoded and modulated HARQ-ACK information bits and potentially other UCI information bits, such as CSI information bits, are rate matched over all symbols of a slot used for a PUCCH transmission, similar to rate matching encoded and modulated data bits over all symbols of a slot used for a PUSCH transmission. The UE determines a CS and OCC value for a generating and transmitting a ZC sequence or a CG sequence that serves as DMRS in the PUCCH based on a C-RNTI the UE is configured by a gNB through higher layer signaling 1420. Subsequently, the UE transmits the PUCCH with an associated DMRS having the determined CS and OCC value 1430.

In a second case, a long PUCCH is not always transmitted until a last symbol of an UL slot or of a hybrid slot and duration variability can occur both at the beginning and at the end of a slot. For example, a long PUCCH transmission cannot occur in last symbols of a slot when a respective BW cannot always be different than a BW used for other UL transmissions such as for transmissions of short PUCCH, SRS, or PRACH. Then, a gNB can configure, for example by higher layer signaling, to a UE a number of last slot symbols for the UE to not include in a long PUCCH transmission, or a UE common DCI format can indicate whether last symbols of a slot are available for PUSCH or PUCCH transmissions, or a DCI format that a UE detects and, in response to the detection, the UE transmits a long PUCCH in a slot, can include a field indicating a number of last symbols in a slot for the UE to avoid for transmission of the long PUCCH, for example by indicating a first slot symbol and a duration for the long PUCCH transmission. Remaining aspects for a long PUCCH transmission can be as in the first case where a long PUCCH is transmitted until a last symbol of an UL slot or of a hybrid slot.

When a long PUCCH transmission spans multiple slots, a UE needs to determine a number of symbols available in each of the multiple slots for the long PUCCH transmission.

In a first approach, a UE can assume a same number of consecutive symbols, with same locations in a slot, for a long PUCCH transmission in each of the multiple slots. The number of consecutive symbols and a location of a first symbol, or of a last symbol, can be informed by a DCI format or by higher layer signaling configuring the long PUCCH transmission in multiple slots. The number of slots, including one slot, can also be informed by a DCI format or by higher layer signaling. The multiple slots can be either consecutive or, in general, have a pattern from a predetermined set of patterns and a UE can be informed of a pattern by a DCI format or by higher layer signaling configuring the long PUCCH transmission in the multiple slots.

For example, a pattern of slots can be periodic and include ten slots, a set can include four patterns, and a UE can be configured one pattern from the four patterns. For example, a pattern can be represented by a bit-map of ten bits where a binary value of "0" indicates that a respective slot can be used for a long PUCCH transmission and a binary value of "1" indicates that a respective slot cannot be used for a long PUCCH transmission over a number of consecutive symbols per slot. For each slot in each pattern that can be used for a long PUCCH transmission, additional configuration can indicate a number of symbols and a starting symbol available for a long PUCCH transmission.

Figure 15:
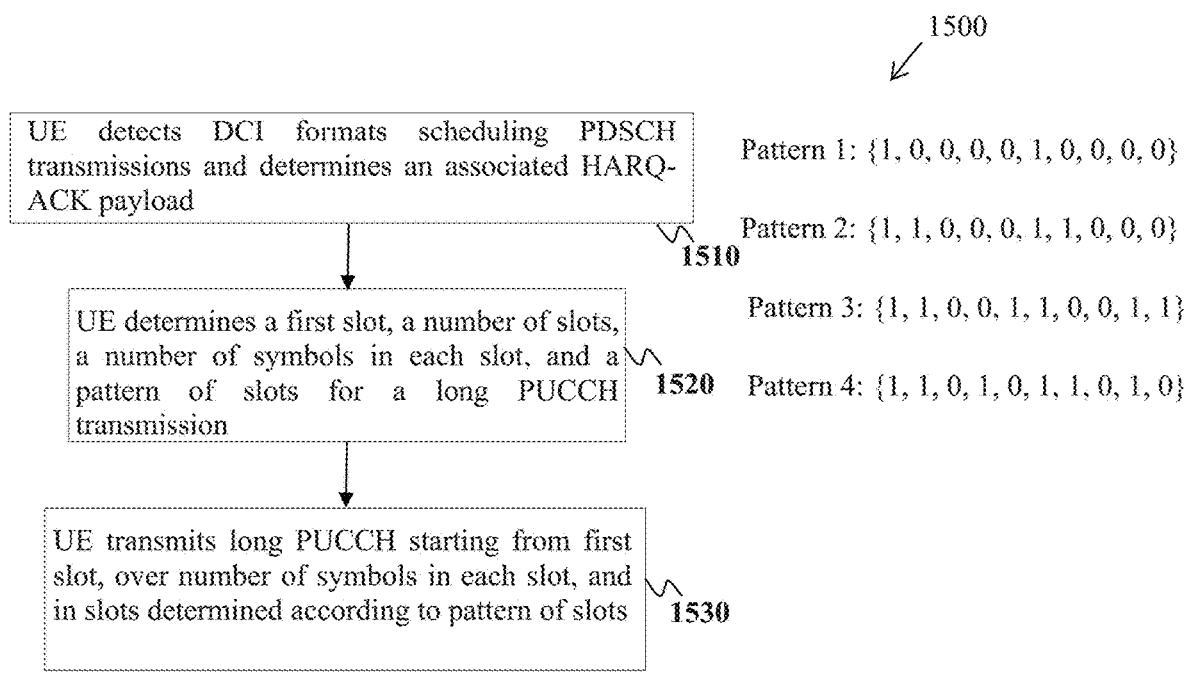
FIG. 15 illustrates yet another example process for a UE according to embodiments of the present disclosure.

FIG. 15 illustrates yet another example process 1500 for a UE according to embodiments of the present disclosure. An embodiment of the process 1500 shown in FIG. 15 is for illustration only. Other embodiments may be used without departing from the scope of the present disclosure.

A UE detects one or more DCI formats, such as DCI formats scheduling PDSCH transmissions 1510. Based on information fields in the one or more DCI formats, the UE determines a first slot for a long PUCCH transmission, a number of slots for the long PUCCH transmission, a number of symbols in each slot for the long PUCCH transmission and, when applicable, a pattern of slots for the long PUCCH transmissions 1520. For example, a pattern is not applicable when all slots can be full UL slots in case of a FDD system. For example, a slot pattern can be one from a set of four slot patterns in case of a TDD system or of a flexible duplex FDD system. Subsequently, the UE transmits the long PUCCH starting from the first slot over the number of symbols in each slot and in slots determined according to the pattern of slots 1530. For example, the first slot can be a third slot in a third pattern from the set of four patterns and the transmission can be over four slots that are the third, fourth, seventh, and eight slots in the third pattern.

Instead of signaling in the one or more DCI formats a number of slots $N_{slot}$ for a long PUCCH transmission, a UE can implicitly determine $N_{slot}$ based on a total number of symbols $N_{symbols}^{total}$ and a number of symbols per slot $N_{symbols}^{slot}$ used for the long PUCCH transmissions. The total number of symbols $N_{symbols}^{total}$ can be indicated in the one or more DCI formats or can be configured to the UE by higher layer signaling. For example, $N_{slot}=\lceil N_{symbols}^{total}/N_{symbols}^{slot}\rceil$ where $\lceil\ \rceil$ is the 'ceiling' function that rounds a number to its next larger integer. A single frequency hop can apply for the PUCCH transmission after $\lceil N_{symbols}^{slot}/2\rceil$ symbols (or after $\lfloor N_{symbols}^{slot}/2\rfloor$ symbols where $\lfloor\ \rfloor$ is the 'floor' function that rounds a number to its next smaller integer), or after $\lceil N_{slot}/2\rceil$ slots (or $\lfloor N_{slot}/2\rfloor$ slots) for a multi-slot PUCCH transmission or frequency hopping can be per slot. Alternatively, a gNB can configure to a UE a reference number of slots $N_{slot}^{ref}$ for repetitions of a long PUCCH transmission for a reference number of available symbols for long PUCCH transmission per slot $N_{symbols}^{slot,ref}$, such as $N_{symbols}^{slot,ref}=14$, and a UE can determine an actual number of slots $N_{slot}^{actual}$ for long PUCCH transmission over an actual number of $N_{symbols}^{slot,actual}$ symbols per slot as $N_{slot}^{actual}=\lceil(N_{symbols}^{slot,ref}/N_{symbols}^{slot,actual})\cdot N_{slot}^{ref}\rceil$.

In a second approach, a UE can determine a number of consecutive symbols for a long PUCCH transmission in each of the multiple slots from a UE-group common DO format. When the UE fails to detect the UE-group common DCI format indicating a structure for a slot, the UE does not transmit a long PUCCH in the slot.

Encoding of a codeword transmitted in a long PUCCH over multiple slots can be over resources of one slot or over resources of more than one slot. When encoding is over resources of one slot, a same encoded codeword is repeated over resources in the multiple slots. When encoding of a codeword is over resources of a number of slots that is larger than one, such as over two slots, a same encoded codeword is repeated over resources in the multiple slots for a number of times equal to the ratio of the number of multiple slots over the number of slots. For example, when the encoding is over two slots and a long PUCCH transmission is over four slots, the encoded codeword over the first two slots is repeated over the second two slots from the four slots.

A selection between encoding a codeword over one slot and encoding a codeword over more than one slot can be indicated by a DCI format configuring the long PUCCH transmission or can be determined according to a resulting code rate that is smaller than a predetermined or configured code rate. For example, when encoding a codeword over resources of one slot results to a code rate smaller than 0.5, encoding is over resources of one slot. Otherwise, when encoding a codeword over resources of one slot results to a code rate equal to or larger than 0.5 and encoding the codeword over resources of two slots results to a code rate smaller than 0.5, encoding is over resources of two slots, and so on.

It is also possible that a number of symbols for a long PUCCH transmission over multiple slots is not same but instead is independently determined for each slot of the multiple slots. For example, a DCI format configuring the long PUCCH transmission over multiple slots from a UE can indicate to the UE a number of symbols for the long PUCCH transmission in each slot from the multiple slots.

For example, a UE can determine a number of symbols for the long PUCCH transmission in each slot from the multiple slots by detecting one or more UE-group common DCI formats indicating a number of symbols available for long PUCCH transmission in each slot. For a long PUCCH format based on a structure of LTE PUCCH formats 1a/1b/2/4/5, scalability can be achieved for an arbitrary number of slots. For a structure based on LTE PUCCH format 1a/1b, at least a pair of {DMRS, UCI} symbols exists in each slot. For a structure based on LTE PUCCH formats 2/4/5, at least two DMRS symbols exist in each slot and remaining symbols for long PUCCH transmission can be used for UCI transmission. In case of frequency hopping where a first number of symbols and a second number of symbols are respectively used for long PUCCH transmission in two separate frequency resources, the first number of symbols can include one DMRS symbol, the second number of symbols can include one DMRS symbol, and remaining symbols can be used for UCI transmission. A same mechanism can also apply for a PUSCH transmission over multiple slots where a UE can independently determine a number of symbols for the PUSCH transmission in each slot.

When a PUCCH transmission from a UE is with frequency hopping, a transient period exists for the UE to set a PUCCH transmission power to a target level after frequency hopping. An impact of the transient period on UE orthogonal multiplexing due to OCC application across DMRS symbols or UCI symbols generally depends on a ratio of the transient period over the symbol duration. The smaller the ratio is, the smaller the impact is. Therefore, for smaller values of sub-carrier spacing resulting to larger values of symbol duration, an impact of the transient period can be negligible in practice while for larger values of sub-carrier spacing resulting to smaller values of symbol duration, an impact of the transient period can be detrimental to orthogonal UE multiplexing using OCCs across DMRS symbols or UCI symbols.

A value of sub-carrier spacing can be defined so that when a sub-carrier spacing is equal to or larger than the value, use of OCC is disabled or PUCCH transmission in a first symbol after (or a last symbol before) frequency hopping is punctured. For example, use of OCC can be enabled for sub-carrier spacing less than 60 KHz and disabled for sub-carrier spacing larger than or equal to 60 KHz. For example, a UE can transmit PUCCH in a first symbol after frequency hopping for a sub-carrier spacing value less than 60 KHz and puncture a PUCCH transmission in a first symbol after frequency hopping for a sub-carrier spacing value equal to or larger than 60 KHz. An OCC after frequency hopping can be determined by excluding the punctured symbol from the number of symbols for PUCCH transmission. For example, for DMRS or UCI transmission over 4 symbols prior to frequency hopping and over 3 symbols after frequency hopping, respective OCC lengths are 4 and 3 and a UE can use an OCC of {1 1 1 1} prior to frequency hopping and an OCC of {1 1 1} after frequency hopping to account for a punctured symbol (long PUCCH transmission can be considered to be over 8 symbols where 1 symbol is punctured).

Similar to a transient period required for a UE to set a PUCCH transmission power to a target level after frequency hopping, a transient period is also required for a UE to set a PUCCH transmission power to a target level after a PUSCH transmission from the UE. A same solution can apply regarding the use of OCC for a PUCCH transmission or for transmission or puncturing of the first PUCCH symbol as for the case a transient period for the UE to set the PUCCH transmission power is due to frequency hopping. Alternatively, a UE can puncture one or more of last PUSCH transmission symbols.

A second embodiment of this disclosure considers a power determination for a long PUCCH transmission when a number of slot symbols available for the long PUCCH transmission are variable.

A formula for determining a PUCCH transmission power for can be adjusted to account for a number of slot symbols used for the PUCCH transmission. This enables use of a TPC command provided by DCI formats, including a single DCI format, associated with the HARQ-ACK transmission in the PUCCH by a UE for compensating short-term fading experienced by the UE. When encoded and modulated UCI symbols are repeated in available slot symbols (except for symbols used for DMRS transmission) for the PUCCH transmission, a UE can determine a PUCCH transmission power in slot i on a cell c by including an adjustment factor for example as given by equation 3:

$$P_{PUCCH,c}(i) = \min \begin{Bmatrix} P_{CMAX,c}(i), \\ P_{0\_PUCCH,c} + \alpha_c \cdot PL_c + h(n_{UCI}) + \Delta_{F\_UL\_ctrl} + \\ \Delta_{TxD} + g(i) + 10\log10(N_{ref}/N_{actual}(i)) \end{Bmatrix} [dBm]$$

Equation (3)

where $N_{ref}$ is a reference number of slot symbols, such as a total number of slot symbols, and $N_{actual}(i)$ is a total number of symbols in a slot i used for the PUCCH transmission.

The adjustment in a PUCCH transmission power enables a UE to compensate a degradation in PUCCH reception reliability due to a PUCCH transmission in an actual number of slot symbols that is smaller than a reference number of slot symbols by increasing an associated transmission power by a ratio of the reference number and the actual number. An additional adjustment can occur when a transmission can be over a number of $N_{PUCCH,c}(i) \geq 1$ RBs as given by equation 4:

$$P_{PUCCH,c}(i) = \min \begin{Bmatrix} P_{CMAX,c}(i), \\ A \end{Bmatrix} [dBm]$$

Here, $A = \{P_{0\_PUCCH,c} + \alpha_c \cdot PL_c + 10 \log_{10}(M_{PUCCH,c}(i)) + h(n_{UCI}) + \Delta_{F\_PUCCH} + \Delta_{TxD} + g(i) + 10 \log 10(N_{ref}/N_{actual}(i))\}$ Equation (4)

When encoded and modulated UCI symbols are rate matched over all available slot symbols, similar to PUCCH Format 4/5 in LTE specification, a UE can determine a transmission power for a PUCCH in slot i on a cell c as given by equation 5

$$P_{PUCCH,c}(i) = \min \begin{Bmatrix} P_{CMAX,c}(i), \\ P_{0\_PUCCH} + \alpha_c \cdot PL_c + 10\log_{10}(M_{PUCCH,c}(i)) + \\ \Delta_{TF,c} + \Delta_{F\_PUCCH}(F) + g(i) \end{Bmatrix} [dBm]$$

Equation (5)

where a power adjustment for a number of available slot symbols is not explicitly required as it can be implicit through a value of the $\Delta_{TF,c}(i)$ that is defined as $\Delta_{TF,c}(i) = 10 \log_{10}(2^{1.25 \cdot BPRE(i)} - 1)$ where $BPRE(i) = O_{UCI}(i)/N_{RE}(i)$, $O_{UCI}(i)$ is a number of UCI bits including CRC bits transmitted on the PUCCH in slot i, $N_{RE}(i) = M_{PUCCH,c}(i) \cdot N_{sc}^{RB} \cdot N_{symb}^{PUCCH}$, and $N_{symb}^{PUCCH}$ is the number of available slot symbols for the PUCCH transmission excluding slot symbols used for DMRS transmission in the PUCCH.

Figure 16:
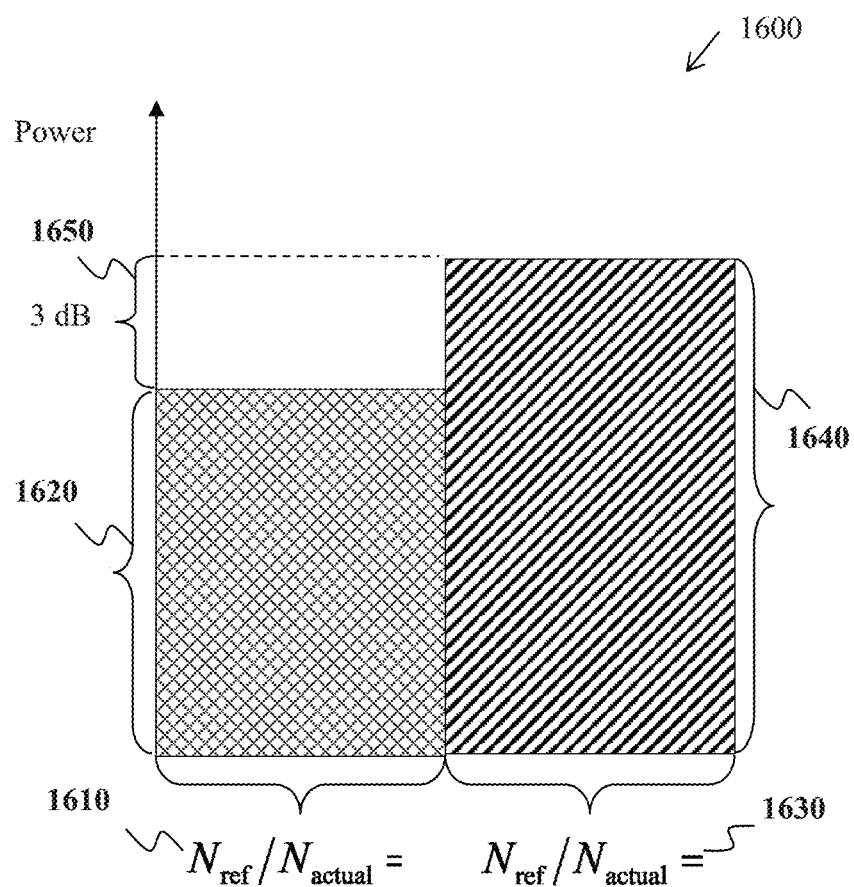
FIG. 16 illustrates an example power adjustment depending on a number of available symbols for PUCCH transmission according to embodiments of the present disclosure.

FIG. 16 illustrates an example power adjustment depending on a number of available symbols for a PUCCH transmission 1600 according to embodiments of the present disclosure. An embodiment of the power adjustment depending on a number of available symbols for a PUCCH transmission 1600 shown in FIG. 16 is for illustration only. Other embodiments may be used without departing from the scope of the present disclosure.

When a number of available slot symbols for a PUCCH transmission are equal to a reference number of symbols 1610, a UE transmits the PUCCH using a first power 1620. When a number of available slot symbols for a PUCCH transmission are smaller than the reference number of symbols by a factor of two 1630, a UE transmits the PUCCH using a second power 1640. The second power is 10 log 10(2) dB=3 dB 1650 larger than the first power.

An HARQ-ACK transmission on a PUCCH from a UE can be in response to the UE detecting a first number of DCI formats in a respective first number of slots, from a second number of DCI formats that a gNB transmits in respective second number of slots on a cell. Each of the DCI formats includes a TPC field that provides a TPC value for the UE to adjust a PUCCH transmission power. As the UE can fail to detect one or more of the second DCI formats, each DCI format provides a TPC value so that the UE has a valid TPC value for adjusting the PUCCH transmission power even when the UE detects only a single DCI format from the second number of DCI formats. TPC values can be different in different DCI formats.

When the UE detects DCI formats conveying different TPC values, the UE can consider a last TPC value in determining an adjustment for a PUCCH transmission power. One reason for this behavior is that when the gNB cannot predict future scheduling decisions, the gNB cannot predict a HARQ-ACK payload. Then, when the UE transmits a PUCCH in response to the UE detecting a number of DCI formats and when different PUCCH formats that have different UL power control processes are associated with different HARQ-ACK payloads, the gNB needs to determine a value for the TPC command based on the PUCCH format associated with the HARQ-ACK payload that results from the gNB transmitting one or more of the last DCI formats from the number of DCI formats. As previously discussed, the DCI formats can also include a field indicating the PUCCH format. The DCI formats can also include a field indicating the HARQ-ACK payload from a predetermined number of HARQ-ACK payloads. For example, a "HARQ-ACK payload" field can be represented by 3 bits mapping to values from a predetermined set of {4, 8, 16, 32, 64, 128, 256, 512}.

In some embodiments, dynamic SR transmission opportunities are considered for a PUCCH. A gNB configures a UE, for example by higher layer signaling, a starting slot and a periodicity of slots for SR transmissions in a PUCCH and a corresponding resource for the PUCCH transmission (SR resource). For example, when a PUCCH structure for SR transmission is based on LTE PUCCH Format 1, the SR resource can include a RB in an UL BW, a CS for an associated CG sequence and an OCC for use across slot symbols. The UE can only assume availability of the SR resource when the UE detects a DCI format conveyed by a PDCCH transmitted from the gNB in a slot and indicating SR transmission in the slot. The slot is one of the slots determined by the starting slot and the periodicity of slots. The starting slot can be from a predetermined number of slots such as 10 slots and the periodicity can be from a set of predetermined periodicities such as {1, 2, 4, 8, 16, 32, 64, 128}. For example, when a gNB configures to a UE a second slot as a starting slot and a periodicity of 4 slots for SR transmissions from the UE, the UE can transmit a SR in a PUCCH when the UE detects a DCI format indicating SR transmission in slot 2, 6, 10, and so on. When the UE detects the DCI format indicating SR transmission in any other slot, the UE does not transmit a PUCCH conveying a SR. The DCI format can be common to a group of UEs (and have a CRC scrambled by UE-group RNTI) that have a same serving cell including all UEs in the serving cell.

Figure 17:
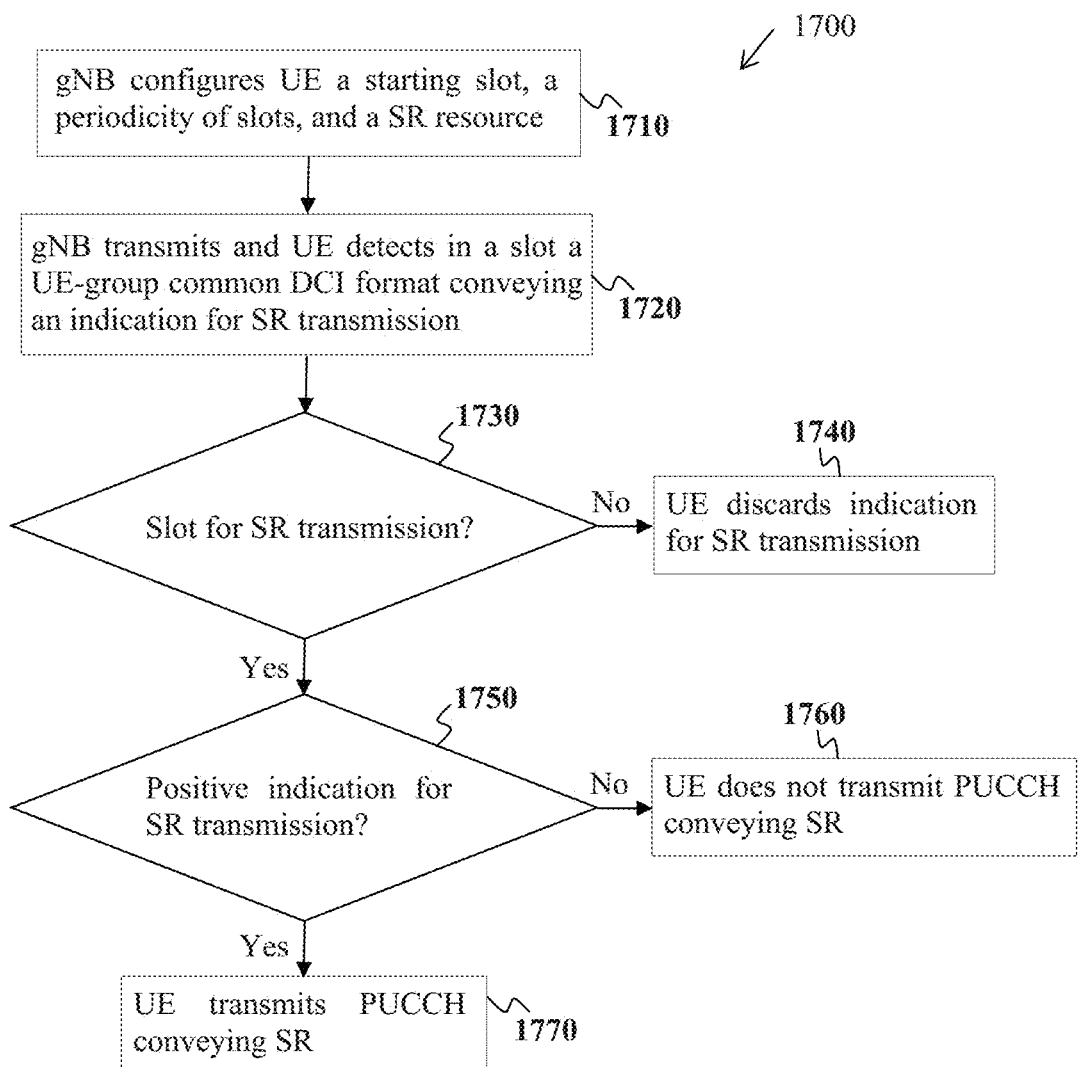
FIG. 17 illustrates yet another example process for a UE according to embodiments of the present disclosure.

FIG. 17 illustrates yet another example process 1700 for a UE according to embodiments of the present disclosure. An embodiment of the process 1700 shown in FIG. 17 is for illustration only. Other embodiments may be used without departing from the scope of the present disclosure.

A gNB configures a UE, using higher layer signaling, a starting slot, a periodicity of slots, and a resource of a PUCCH format for a SR transmission from the UE 1710. The gNB transmits and the UE detects in a slot a UE-group common DCI format conveying an indication for SR transmission 1720. The UE examines whether or not the slot is in the grid of slots, as determined by the starting slot and the periodicity of slots, for SR transmission 1730. When the slot is not a slot for SR transmission from the UE, the UE does not transmit a PUCCH conveying a SR 1740. When the slot is a slot for SR transmission from the UE, the UE determines whether or not the UE has a positive SR to transmit 1750. When the UE does not have a positive SR to transmit, the UE does not transmit an UL control channel to convey a SR 1760. When the UE has a positive SR to transmit, the UE transmits a PUCCH to convey a SR 1770.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE), comprising:
a transceiver configured to receive a configuration for a code rate; and
a processor operably connected to the transceiver, the processor configured to determine a smallest number of resource blocks (RBs) in a frequency domain required to transmit an uplink control information (UCI) on a physical uplink control channel (PUCCH) with a UCI code rate smaller than or equal to the code rate,
wherein the transceiver is further configured to transmit the PUCCH over the determined number of RBs.

2. The UE of claim 1, wherein:
the transceiver is further configured to receive a configuration for a set of RBs, and
an RB from the set of RBs is a first RB from the smallest number of RBs.

3. The UE of claim 2, wherein:
the transceiver is further configured to receive a physical downlink control channel (PDCCH) conveying a downlink control information (DCI) format, and
the DCI format includes a field with a value indicating the RB from the set of RBs.

4. The UE of claim 1, wherein the transceiver is further configured to:
receive a configuration for a set of symbols of a slot, and
transmit the PUCCH in a slot starting from a symbol from the set of symbols.

5. The UE of claim 1, wherein the transceiver is further configured to:
receive a configuration for a set of numbers of symbols of a slot, and
transmit the PUCCH in a slot over a number of symbols from the set of numbers of symbols.

6. The UE of claim 1, wherein the transceiver is further configured to:
receive a configuration for a set of PUCCH formats, and
transmit the PUCCH using a PUCCH format from the set of PUCCH formats.

7. The UE of claim 1, wherein the transceiver is further configured to receive a physical downlink control channel (PDCCH) conveying a downlink control information (DCI) format, and
wherein the DCI format includes a field with a value indicating a first slot for the PUCCH transmission.

8. A base station, comprising:
a transceiver configured to transmit a configuration for a code rate; and
a processor operably coupled to the transceiver, the processor configured to determine a smallest number of resource blocks (RBs) in a frequency domain required to receive an uplink control information (UCI) on a physical uplink control channel (PUCCH) with a UCI code rate smaller than or equal to the code rate,
wherein the transceiver is further configured to receive the PUCCH over the determined number of RBs.

9. The base station of claim 8, wherein the transceiver is further configured to receive a configuration for a set of RBs, and
wherein an RB from the set of RBs is a first RB from the smallest number of RBs.

10. The base station of claim 9, wherein the transceiver is further configured to transmit a physical downlink control channel (PDCCH) conveying a downlink control information (DCI) format, and
wherein the DCI format includes a field with a value indicating the RB from the set of RBs.

11. The base station of claim 8, wherein the transceiver is further configured to:
transmit a configuration for a set of symbols of a slot, and
receive the PUCCH in a slot starting from a symbol from the set of symbols.

12. The base station of claim 8, wherein the transceiver is further configured to:
transmit a configuration for a set of numbers of symbols of a slot, and
receive the PUCCH in a slot over a number of symbols from the set of numbers of symbols.

13. The base station of claim 8, wherein the transceiver is further configured to:
transmit a configuration for a set of PUCCH formats, and
receive the PUCCH using a PUCCH format from the set of PUCCH formats.

14. The base station of claim 8, wherein the transceiver is further configured to transmit a physical downlink control channel (PDCCH) conveying a downlink control information (DCI) format, and
wherein the DCI format includes a field with a value indicating a first slot for the PUCCH reception.

15. A method for transmitting a physical uplink control channel (PUCCH), the method comprising:
receiving a configuration for a code rate;
determining a smallest number of resource blocks (RBs) in a frequency domain required to transmit an uplink control information (UCI) on a physical uplink control channel (PUCCH) with a UCI code rate that is smaller than or equal to the code rate; and transmitting the PUCCH over the determined number of RBs.

16. The method of claim 15, further comprising:

receiving a configuration for a set of RBs, wherein an RB from the set of RBs is a first RB from the smallest number of RBs.

17. The method of claim 16, further comprising:

receiving a physical downlink control channel (PDCCH) conveying a downlink control information (DCI) format, wherein the DCI format includes a field with a value indicating the RB from the set of RBs.

18. The method of claim 15, further comprising:

receiving a configuration for a set of symbols of a slot; and transmitting the PUCCH in a slot starting from a symbol from the set of symbols.

19. The method of claim 15, further comprising:

receiving a configuration for a set of numbers of symbols of a slot, and transmitting the PUCCH in a slot over a number of symbols from the set of numbers of symbols.

20. The method of claim 15, wherein:

receiving a configuration for a set of PUCCH formats, and transmitting the PUCCH using a PUCCH format from the set of PUCCH formats.

* * * * *